(12) United States Patent
Neto

(10) Patent No.: US 10,069,655 B2
(45) Date of Patent: Sep. 4, 2018

(54) HALF-RATE INTEGRATING DECISION FEEDBACK EQUALIZATION WITH CURRENT STEERING

(71) Applicant: Xilinx, Inc., San Jose, CA (US)

(72) Inventor: Pedro W. Neto, Douglas (IE)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/066,354

(22) Filed: Mar. 10, 2016

(65) Prior Publication Data

US 2017/0264467 A1    Sep. 14, 2017

(51) Int. Cl.
*H04L 25/03*    (2006.01)
*H04L 27/01*    (2006.01)

(52) U.S. Cl.
CPC .. *H04L 25/03057* (2013.01); *H04L 25/03019* (2013.01); *H04L 27/01* (2013.01)

(58) Field of Classification Search
CPC ......... H04L 25/03057; H04L 25/03019; H04L 27/01
See application file for complete search history.

(56) References Cited

U.S. PATENT DOCUMENTS

| | | | |
|---|---|---|---|
| 8,537,886 B1 * | 9/2013 | Su ..................... | H04L 25/03057 375/233 |
| 8,862,951 B2 * | 10/2014 | Huang .............. | H04L 25/03057 326/40 |
| 2006/0239341 A1 | 10/2006 | Marlett et al. | |
| 2009/0252215 A1 * | 10/2009 | Bulzacchelli ..... | H04L 25/03031 375/233 |
| 2012/0250753 A1 * | 10/2012 | Zhong ............... | H04L 25/03057 375/233 |

(Continued)

FOREIGN PATENT DOCUMENTS

JP    2012175504    9/2012

OTHER PUBLICATIONS

"All you need to know about SoC Design Methodologies and Techniques", Jul. 27, 2014, pp. 1-2.*

(Continued)

*Primary Examiner* — Sophia Vlahos
(74) *Attorney, Agent, or Firm* — W. Eric Webostad; David O'Brien

(57) ABSTRACT

Apparatuses and method relating to DFE include a decision feedback equalizer with first and second integrating summers configured to receive an input differential signal. A bias current circuit is configured to alternate biasing of the first and second integrating summers. The first and second integrating summers alternately integrate, during clock signal phases of a clock signal and its complement, for transconductance of the input differential signal to a first output differential signal and a second output differential signal, respectively. The first and second integrating summers alternately drive, during other clock signal phases of the clock signal and its complement, residual voltages of the first output differential signal and the second output differential signal, respectively, to a same voltage level. A first clock signal and a second clock signal are out of phase with respect to one another for interleaving the first output differential signal and the second output differential signal.

19 Claims, 11 Drawing Sheets

(56) References Cited

U.S. PATENT DOCUMENTS

2013/0214865 A1\* 8/2013 Bulzacchelli ......... H03F 1/0261
330/261
2014/0307769 A1\* 10/2014 He ....................... H04L 7/0062
375/233

OTHER PUBLICATIONS

Savoj, Jafar et al., "A wide Common-Mode Fully-Adaptive Multi-Standard 12.5Gb/s Backplane Transceiver in 28nm CMOS", IEEE, 2012 Symposium on VLSI Circuits Digest of Technical Papers, pp. 104-105, Jun. 13-15, 2012, Honolulu, HI, USA.

Park, Matt et al., "Behavioral simulation of decision feedback equalizer architectures Using CppSim", pp. 1-28, Oct. 31, 2005, http://www-mtl.mit.edu/research/perrottgroup/.

Altera Corporation, "Decision Feedback Equalization in Stratix IV Devices", Application Note AN-612-1.2, 1-10 pp., Sep. 2015, San Jose, CA USA.

Lim Hyun-Wook et al., "10.4 A 5.8Gb/s adaptive integrating duobinary-based DFE receiver for multi-drop memory interface", 2015 IEEE International Solid-State Circuits Conference—(ISSCC) Digest of Technical Papers, IEEE, Feb. 22, 2815 (Feb. 22, 2015), pp. 1-3.

Ismail Ahmed et al., "A 8 Gbps 0.67mW 1 tap current integrating DFE I n 40nm CMOS", 2013 IEEE 56th International Midwest Symposium on Circuits and Systems (MWSCAS), IEEE, Aug. 3, 2014 (Aug. 3, 2014), pp. 81-84.

\* cited by examiner obtaining an input differential signal by a first integrating summer and a second integrating summer having a bias current circuit in common
801 first integrating with the first integrating summer during a first clock phase of a first clock signal for transconductance of the input differential signal to a first output differential signal
802 first resetting with the second integrating summer during the first clock phase of the first clock signal for driving residual voltages of a second output differential signal to the same voltage level
803 second integrating with the second integrating summer during a second clock phase of the first clock signal for transconductance of the input differential signal to the second output differential signal
804 second resetting with the first integrating summer during the second clock phase of the first clock signal for driving residual voltages of the first output differential signal to same voltage level
805 electrically coupling a bias current from the bias current circuit to an odd bias node of a first amplifier
811 electrically decoupling the same voltage level from a first pair of transistors of the first amplifier
812 electrically decoupling the bias current from the bias current circuit from an even bias node of a second amplifier
813 electrically coupling the same voltage level to a second pair of transistors of the second amplifier
814 electrically coupling the bias current from the bias current circuit to the even bias node of the second amplifier
815 electrically decoupling the same voltage level from the second pair of transistors
816 electrically decoupling the bias current from the bias current circuit from the odd bias node of the first amplifier
817 electrically coupling the same voltage level to the first pair of transistors
818

HALF-RATE INTEGRATING DECISION FEEDBACK EQUALIZATION WITH CURRENT STEERING

FIELD OF THE INVENTION

The following description relates to integrated circuit devices ("ICs"). More particularly, the following description relates to a half-rate integrating decision feedback equalization with current steering for an IC.

BACKGROUND

For transmission of wireline data, such transmitted data is conventionally attenuated, delayed and/or corrupted after propagating through a wireline communications channel. Along those lines, intersymbol interference ("ISI") may occur as is known from transmission of wireline data through a wireline communications channel. Hence, it is desirable and useful to provide feedback equalization of received wireline data, including without limitation decision feedback equalization ("DFE").

SUMMARY

An apparatus relates generally to a decision feedback equalizer. In such an apparatus, a first integrating summer and a second integrating summer each are configured to receive an input differential signal. A bias current circuit is configured for alternate biasing of the first integrating summer and the second integrating summer. The first integrating summer is configured for integrating during a first clock phase of a first clock signal for transconductance of the input differential signal to a first output differential signal and for resetting during a second clock phase of the first clock signal for driving residual voltages of the first output differential signal to a same voltage level. The second integrating summer is configured for integrating during a first clock phase of a second clock signal for transconductance of the input differential signal to a second output differential signal and for resetting during a second clock phase of the second clock signal for driving residual voltages of the second output differential signal to the same voltage level. The first clock signal and the second clock signal are configured to be out of phase with respect to one another for interleaving the first output differential signal and the second output differential signal.

A method relates generally to decision feedback equalization. In such a method, an input differential signal is obtained by a first integrating summer and a second integrating summer having a bias current circuit in common. First integrating is performed with the first integrating summer during a first clock phase of a clock signal for transconductance of the input differential signal to a first output differential signal. First resetting is performed with the second integrating summer during the first clock phase of the clock signal for driving residual voltages of a second output differential signal to the same voltage level. Second integrating is performed with the second integrating summer during a second clock phase of the clock signal for transconductance of the input differential signal to the second output differential signal. Second resetting is performed with the first integrating summer during the second clock phase of the clock signal for driving residual voltages of the first output differential signal to same voltage level.

An apparatus relates generally to decision feedback equalizer. In such an apparatus, a single stage integrating summer has a first integrating summer and a second integrating summer and has a bias current circuit in common as between the first integrating summer and the second integrating summer. Each of the first integrating summer and the second integrating summer are configured to receive a same input differential signal. The first integrating summer is configured for integrating during a first bit period for transconductance of the input differential signal to a first output differential signal and for resetting during a second bit period immediately following the first bit period for driving residual voltages of the first output differential signal to a same voltage level. The second integrating summer is configured for integrating during the second bit period for transconductance of the input differential signal to a second output differential signal and for resetting during a third bit period immediately following the second bit period for driving residual voltages of the second output differential signal to the same voltage level.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is graphical diagram depicting an exemplary conventional stream of transmission pulses and corresponding reception and ISI pulses.

FIG. 1-3 is graphical diagram depicting an exemplary conventional stream of reception and ISI pulses without decision feedback equalization ("DFE") for the superposed pulse responses of FIG. 1-2.

FIG. 2-1 is the graphical diagram of FIG. 1-1 with an exemplary DFE illustratively depicted as postcursor ISI counteracting pulses.

FIG. 2-2 is the graphical diagram of FIG. 1-2 after an exemplary DFE.

FIG. 2-3 is the graphical diagram of FIG. 1-3 after an exemplary DFE for the superposed pulse responses of FIG. 2-2.

FIG. 3 is a schematic diagram depicting an exemplary embodiment of a conventional decision feedback equalizer.

FIG. 8 is a flow diagram depicting an exemplary DFE summer operational flow for DFE, such as for the DFE summers of FIGS. 6 and 7.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Figure 1:
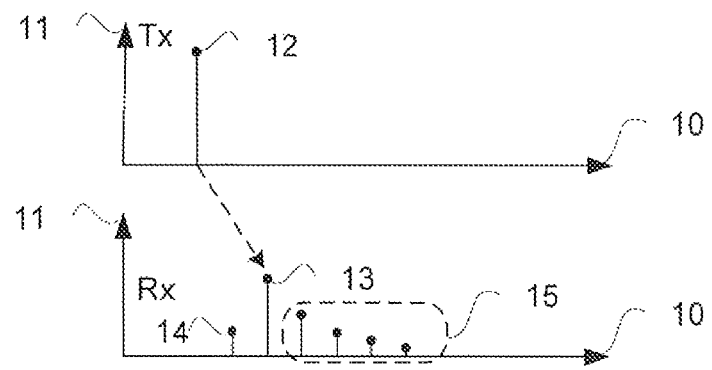
FIG. 1-1 is graphical diagram depicting an exemplary conventional transmission pulse and a corresponding reception and intersymbol interference ("ISI") pulses.

Before describing the examples illustratively depicted in the several figures, a general introduction is provided to further understanding. FIG. 1-1 is graphical diagram depicting an exemplary conventional transmission pulse and a corresponding reception and intersymbol interference ("ISI") pulses. Transmission pulse 12, as well as a corresponding reception or received pulse, namely a corresponding cursor pulse 13, is respectively depicted along a time x-axis 10 versus an amplitude y-axis 11. Generally, cursor pulse 13 is a delayed and attenuated version of transmission pulse 12. Transmission pulse 12 may be encoded as a symbol prior to transmission, and during propagation through a wireline communications channel to a receiver, such transmission pulse may interfere and/or be interfered with by one or more other transmission pulses. This ISI may result in receiving one or more precursor ISI pulses, such as precursor ISI pulse 14, and one or more postcursor ISI pulses, such as postcursor ISI pulses 15, along with cursor pulse 13.

Figures 1, 2:
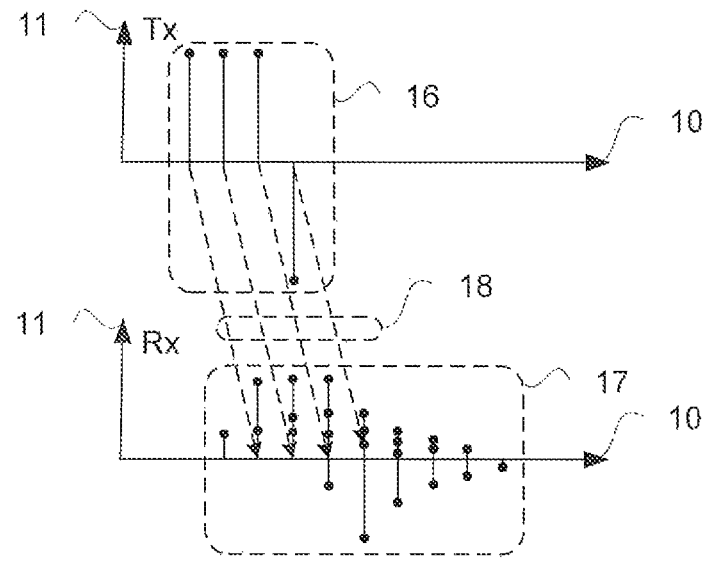

FIG. 1-2 is graphical diagram depicting an exemplary conventional stream of transmission pulses and corresponding reception and intersymbol interference ("ISI") pulses. In this example, there are three positive followed by one negative transmission pulse in stream of transmission pulses 16. While these transmission pulses result in corresponding reception pulses, as generally indicated by arrows 18, such reception pulses may be superposed with one or more ISI pulses, such a precursor and/or one or more postcursor ISI pulses in this example, as generally indicated as stream of reception pulses 17, namely superposed pulse responses. For a stream of transmission pulses 16, in each sampling instance, one or more ISI pulses may be added to a received pulse, which may mislead detection by a receiver resulting in one or more errors.

Figures 1, 2, 3:
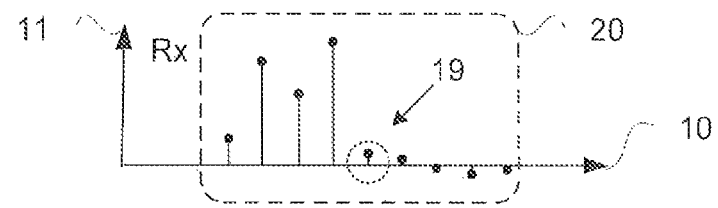
Figures 1, 2:
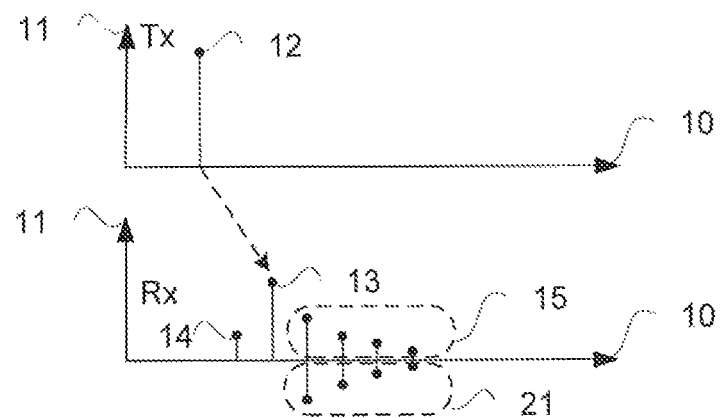
Figure 2:
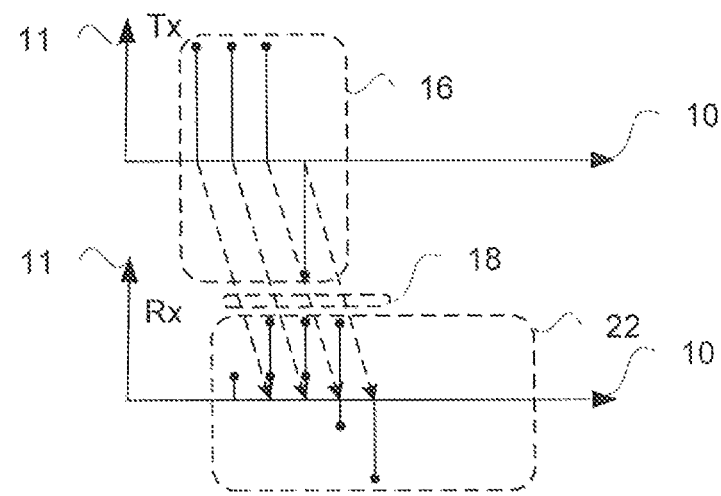
Figures 2, 3:
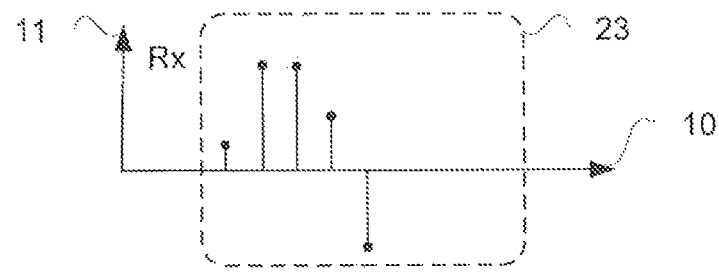
Figure 3:
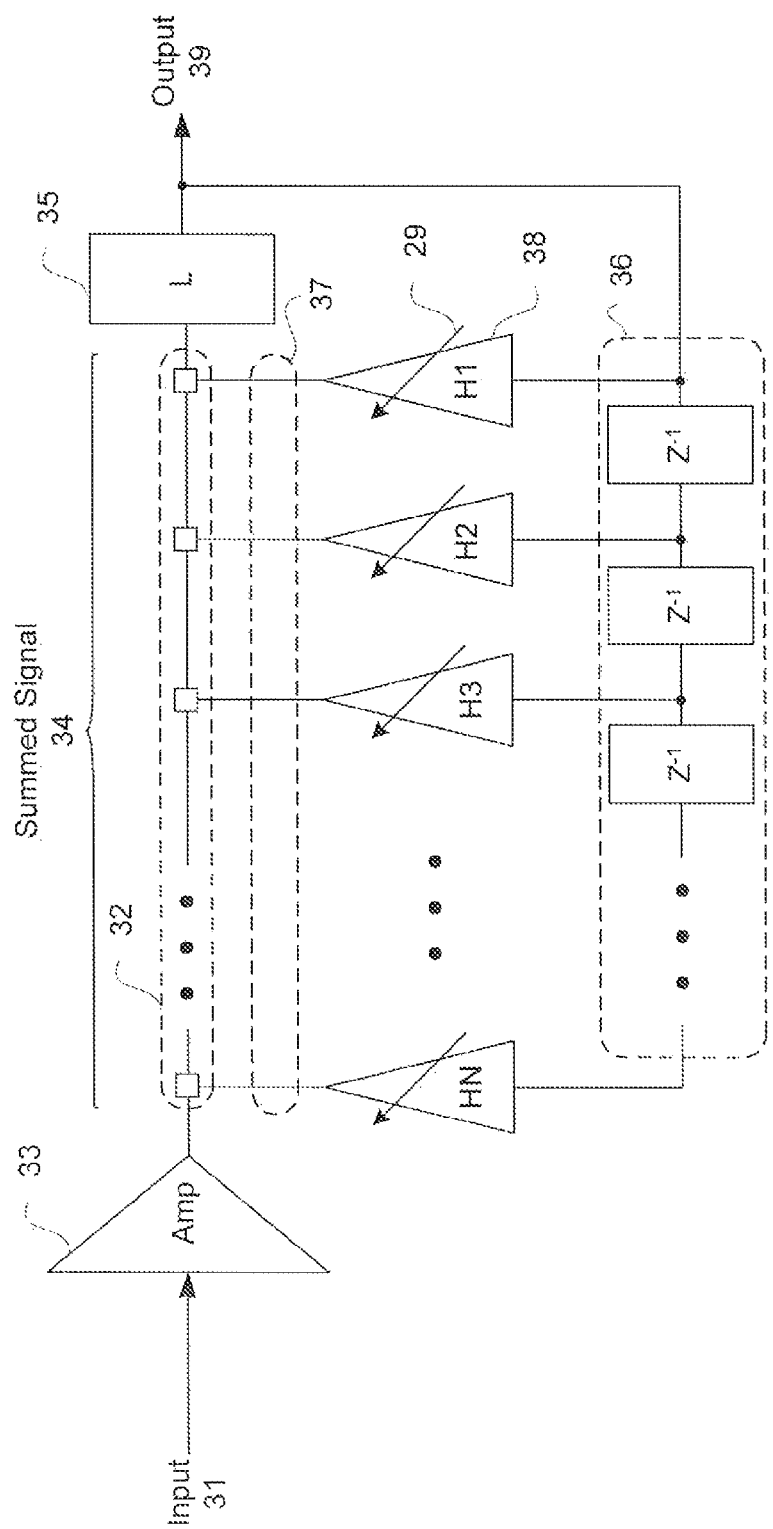

FIG. 1-3 is graphical diagram depicting an exemplary conventional stream of reception and ISI pulses without decision feedback equalization ("DFE") for the superposed pulse responses of FIG. 1-2. Received stream of pulses 20 may be a resultant response at a receiver after detection. However, in this example, an error 19 results from such detection.

DFE may be used to remove or at least substantially reduce postcursor ISI by adding data dependent correction voltages to a scaled version of a received input. A resultant voltage at a decision point of a detector receiving an input may thus have less corruption due to postcursor ISI yielding fewer errors, namely error probability is reduced.

FIG. 2-1 is the graphical diagram of FIG. 1-1 with an exemplary DFE illustratively depicted as postcursor ISI counteracting pulses 21. DFE taps, namely correction TAPs, may act as inverses of postcursor ISI pulses 15. Removal or at least substantial reduction of postcursor ISI pulses 15 may assist a detector of a receiver in resolving a cursor pulse 13. Along those lines, DFE taps of a decision feedback equalizer may be respectively weighted to match a channel response of a transmission communications channel to provide an inverse signal of postcursor ISI, positive or negative. After DFE, a resultant response at a receiver may just be a precursor ISI pulse 14 and a cursor pulse 13.

FIG. 2-2 is the graphical diagram of FIG. 1-2 after an exemplary DFE. In this example, postcursor ISI is removed by DFE, leaving received cursor pulses with or without precursor ISI pulses superposed thereon, namely stream of reception pulses 22 for stream of transmission pulses 16 received from a communications channel as generally indicated by arrows 18.

FIG. 2-3 is the graphical diagram of FIG. 1-3 after an exemplary DFE for the superposed pulse responses of FIG. 2-2. Received stream of pulses 23 may be a resultant response at a receiver after DFE and after detection. However, in this example, an error 19 does not result from such detection. Use of DFE may reduce error probability by removing or substantially reducing signal corruption due to postcursor ISI.

FIG. 3 is a schematic diagram depicting an exemplary embodiment of a conventional decision feedback equalizer 30. DFE is implemented as a feedback loop 35 where input 31, such as a received stream of reception pulses 17 prior to DFE or generally "input data", is input to and amplified by an amplifier 33. Output of amplifier 33 is provided onto a chain of correction circuits ("correction TAPs"). Such amplified input data output from amplifier 33 is progressively adjusted by summing over a positive integer number, N, of correction TAPs, provided by adjustable buffers 38 respectively coupled to a chain of adders 32, to provide a summed signal 34.

Each adjustable buffer 38 has a current sink capability, defined by an adjustable tap weight 29. Inputs to adjustable buffers 38 respectively from delays of delay chain 36 define a signal of an applied current (i.e., if a current is sunk from a positive or negative line). Chain of adders 32 may be a "line" for adding currents to provide a summed signal 34.

Summed signal 34 is input to a dynamic comparator or sampler ("L") 35 for sampling to make decisions, namely to output digital data from an analog differential signal. For purposes of clarity and not limitation, a clock signal and other known details regarding operation of dynamic comparator 35 are not illustratively depicted.

Summed signal 34 is sampled by a dynamic comparator 35, and a comparison result 39 for such sampling output from dynamic comparator 35 is output. Comparison results 39 may be generally referred to as "output data". Each comparison result 39 may be fed back through delay chain 36 in order to define or refine correction TAP signals 37 provided to corresponding adders 32. Decision feedback equalizer 30 is a nonlinear equalizer, as it uses previous decisions or comparison results to eliminate or reduce ISI on pulses currently being processed.

Each tap weight 29 may be defined by an adaptive algorithm in order to match accurately a communications channel ISI impulse response, as generally represented by adjustable buffers 38, though implemented as multipliers coupled to receive respective weights 29. Adjustable buffers 38 may be coupled to receive a progressively delayed comparison result 39 tapped out from delay chain 36 from a corresponding tap thereof. In FIG. 3, each delay in delay chain 36 may represent one unit interval ("1UI") of delay. Outputs of adjustable buffers 38 may be output to corresponding correction adders/subtractors 32 associated with such adjustable buffers 38 for subtraction. As decision feedback equalizer 30 is well known, it is not described in unnecessary detail for purposes of clarity and not limitation.

In a decision feedback equalizer, such as decision feedback equalizer 30 for example, a significant contributor to power consumption is amplifier 33 and adjustable buffers 38. A circuit used to amplify an input signal and provide correction TAPs is conventionally referred to as a "DFE summer" or "summing amplifier" and conventionally is implemented with a number N of transconductance pairs ("gm-pairs") of transistors coupled in parallel for sharing a resistive load.

Power consumption in continuous time DFE summer may be set by output capacitance and settling time. Along those lines, a continuous time DFE summer is generally said to be fully settled or fully steered within 3 to 4 RC time constants in one bit period, namely half of a clock period or 1 unit interval ("1UI"), for an effective postcursor ISI correction. In other words, summed signal 34 is to be fully settled in 1UI. A bit of output differential voltage of output, namely comparison results 39, has different timing constraints than summed signal 34. If input 31 represents a string of bits, then each corresponding bit in summed signal 34 input to dynamic comparator 35 may be settled within 1UI. For a differential output change from logic 1 to logic 0, or vice versa, then voltage may have a rail-to-rail swing or transition in 1UI. Thus, such transitions are to be settled within 1UI, namely before sampling by dynamic comparator 35.

Generally, output voltage swing, Vsw, is fixed, and output capacitance, Cout, is set by input gate sizes of dynamic comparator 35, interconnection capacitance, and parasitic capacitance of correction TAPs. Power consumption may be generally adjusted by a resistance, R, as Vsw and Cout may be generally considered set values. Along those lines, bandwidth may define resistance R, as a time constant is defined by RC. A biasing current Ib (power) may then be defined by a value for resistance R to attain a target bandwidth for a specified voltage swing Vsw. In other words, resistance, R, may be considered Vsw divided by biasing current Ib output from current source of amplifier 33. A minimum settling time may be approximately three RC time constants of a continuous time DFE summer, namely 3×RCout; however, longer settling times, such as higher multiples than three of an RC time constant, may be used in other implementations.

High current values, namely small resistances, may be used to achieve a 3×RC settling time in one bit period or 1UI. With these parameters, a bias current output from bias current source may be set equal to or greater than a 3×Vsw-Cout/1UI. Bias current may be increased above a 3× multiple to improve linearity and/or to increase current density, as may vary from application-to-application.

Unfortunately, a continuous time DFE summer is slowed by settling time and consumes significant power, which may preclude use of a continuous time DFE summer in high-speed applications and/or low power applications.

Figure 4:
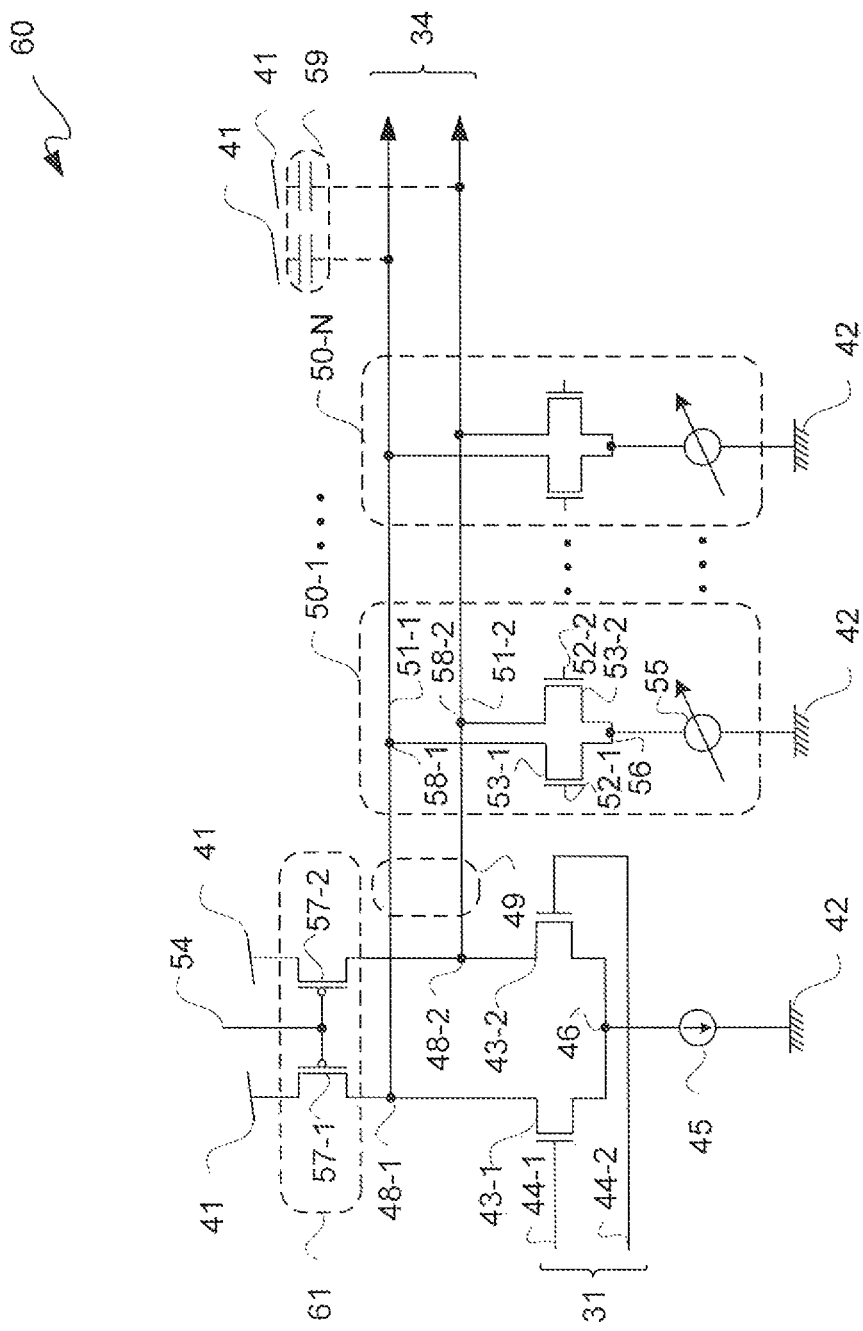
FIG. 4 is a schematic diagram depicting an exemplary conventional integrating DFE summer.

FIG. 4 is a schematic diagram depicting an exemplary integrating DFE summer 60. FIG. 4 is further described with simultaneous reference to FIGS. 3 and 4.

Integrating DFE summer 60 replaces load resistors of a continuous time DFE summer with PMOS transistors forming a clocked reset switch 61. Integrating DFE summer 60 is more power efficient than continuous time DFE summer.

Additionally, where a continuous time DFE summer may fully settle in a 3×RC equivalent to a 1UI for proper operation thereof, integrating DFE summer 60 integrates an input 31 during 1UI. This integration of an input in 1UI may be compared to settling in one RC time constant for unitary gain. With these parameters, a bias current, Ib, output from bias current source 45 may be set equal to or greater than a VswCout/1UI. Along those lines, bias current in DFE summer 60 may be reduced by a factor of 3 as compared with continuous time DFE summer.

DFE summer 60 is coupled between a supply voltage ("supply node") 41 and a ground voltage ("ground node") 42. Input data 31 is a differential input, namely summer input, and input data is differentially provided to gates of a pair of transistors. In this example, NMOS transistors are illustratively depicted; however, these and/or other types of transistors may be used in other implementations. Along those lines, even though NMOS transistors are used another type of polarity, such as PMOS transistors, may be used though with source and ground nodes reversed.

A positive ("true") input voltage side ("Vinp") 44-1 of input data 31 is provided to a gate of transistor 43-1, and a negative ("complement") input voltage side ("Vinn") 44-2 of input data 31 is provided to a gate of transistor 43-2. Source nodes of transistors 43-1 and 43-2 are commonly coupled at source node 46 to receive a bias current from current source 45, which current source 45 is coupled between ground node 42 and source node 46. In this example, current source 45 is a fixed current source.

Drain nodes 48-1 and 48-2 respectively of transistors 43-1 and 43-2 are respectively coupled to drain nodes of PMOS transistors 57-1 and 57-2, and source nodes of transistors 57-1 and 57-2 are commonly coupled at supply node 41. Transistors 57 and transistors 43 may be thought of as amplifier 33 of FIG. 3 coupled to a current source 45, where a differential output 49 from amplifier 33 is sourced from drain nodes 48-1 and 48-2, or more generally DFE summer output nodes 48-1 and 48-2. While current source 45 may be considered part of amplifier 33, for purposes of clarity and not limitation current source 45 is considered separately from amplifier 33. Moreover, transistors 57 may be considered a separate clocked reset switch 61.

Drain nodes 48-1 and 48-2 for differential output 49, respectively a positive side output voltage ("Vop") and a negative side output voltage ("Von"), are respectively coupled to a positive side conductive line 51-1 and a negative side conductive line 51-2 for providing a differential DFE summer output or summed signal 34. Chain of correction TAPs may be formed of a chain of current steering circuits 50-1 through 50-N. Each of current steering circuits 50-1 through 50-N includes a gm-pair of transistors coupled in parallel and an adjustable current source, so generally only current steering circuit 50-1 is described below in detail for purposes of clarity and not limitation.

Input differentially provided to gates of each pair of transistors, such as transistors 53-1 and 53-2 for example, coupled for transconductance is feedback from a delay chain, such as delay chain 36 of FIG. 3, for differential feedback input of a differential voltage output, such as comparison results 39. Along those lines, each current steering circuit 50 may include an adjustable current source 55 for adjustment, and thus each adjustable buffer 38 of FIG. 3 is effectively implement as a current steering source coupled to a pair of transconductance transistors in FIG. 4. In this example, NMOS transistors are illustratively depicted; however, these and/or other types of transistors may be used in other implementations.

A positive side 52-1 of a comparison result 39, such as via a delay chain as previously described, may be provided to a gate of transistor 53-1, and a negative side 52-2 of such a comparison result 39 may be provided to a gate of transistor 53-2. Source nodes of transistors 53-1 and 53-2 are commonly coupled at source node 56 to receive an adjustable bias current from current source 55, which current source 55 is coupled between ground node 42 and source node 56. Drain nodes 58-1 and 58-2 respectively of transistors 53-1 and 53-2 are respectively coupled to conductive lines 51-1 and 51-2, which are effectively respectively coupled to load transistors 57-1 and 57-2 at respective ends thereof. A positive or negative correction may thus be applied.

Current steering circuits 50 are configured only to subtract current for providing a summed signal 34. However, a positive correction is obtained responsive to current subtracted from a negative output rail, and a negative correction is obtained responsive to current subtracted from a positive output rail.

Along those lines, using only subtraction, a positive or negative correction may be obtained from each pair of drain nodes 58-1 and 58-2 from each of current steering circuits 50 for progressive correction onto a differential output 49 obtained from DFE summer output nodes 48-1 and 48-2 for providing a differential DFE summer output or summed signal 34. Along those lines, amplifier 33 and current steering circuits 50 share load of transistors 57-1 and 57-2 as respectively coupled to conductive lines 51-1 and 51-2.

Even though a maximum differential voltage capable of being output from amplifier 33 is a voltage difference between supply node 41 and ground node 42, less voltage drops due to resistive loads of transistors 57, a maximum output swing for an integrating summer is generally limited to approximately ⅓ of supply voltage at supply node 41 in order to have sufficient linear behavior. One or more of current steering circuits 50 may be used to apply differential voltage to a voltage output from amplifier 33 by current steering. Current steering, namely adjustment of current sources 55 is respectively controlled by feedback, namely respective outputs of adjustable buffers 38. Along those lines, voltage amplitude may be progressively adjusted to correct for a communications channel.

In order to save power, load resistors of a continuous time DFE summer are replaced by a PMOS clocked reset switch 61 in integrating DFE summer 60. In this implementation, PMOS transistors 57-1 and 57-2 respectively replace transistors 57-1 and 57-2.

For integrating DFE summer 60, output capacitance may be charged to a supply voltage level, such as an analog Vtt voltage ("avtt") for example, of supply node 41 during one UI and such capacitance may be discharged by a gm-pair current, namely current driven through transistors 43-1 and 43-2, during the immediately next IU. Along those lines, gates of PMOS transistors 57-1 and 57-2 may be commonly coupled to receive a clock signal 54 to periodically electrically couple and decouple drain nodes 48-1 and 48-2 to and from an analog supply voltage, such as analog Vtt for example, sourced from supply node 41. In brief, a gm-pair differential current is transconducted through transistors 43 for integrating through output capacitance when clocked reset switch 61 is open, namely clock signal 54 is at a high voltage level for electrically decoupling transistors 43 from supply node 41 for generating a differential voltage in differential output 49 proportional to a corresponding input differential voltage 31.

However, during a reset phase, namely when transistors 43 are electrically coupled to supply node 41 through PMOS transistors 57, namely when clock signal 54 is at a low voltage level, a data dependent residual differential voltage may be present on drain nodes 48-1 and 48-2. This residual voltage may generate an offset in a next integrating period of DFE summer 60, namely when next PMOS transistors 57 are in a substantially conductive state responsive to a low state of clock signal 54. An amount of offset may depend on data present in integrating DFE summer 60 during a reset phase immediately prior to an integrating phase, and such offset may mislead a DFE decision of dynamic comparator 35. Moreover, for high-speed operation, such offset may have less time to dissipate prior to a next sampling by dynamic comparator 35. Thus, this offset may increase error probability. However, keeping such offset in a reset phase to an acceptably low level using just an integrating DFE summer 60 may involve a significant increase in size of PMOS transistors 57, resulting in increased power consumption due to buffering of clock signal 54.

As described below in additional detail, settling time is avoided by an integrating DFE summer though with substantially less data dependent residual differential voltage than integrating DFE summer 60 without a significant increase in the size. Along those lines, effectively an amplifier of integrating DFE summer 60 is duplicated, though with a common bias current circuit for half-rate ("odd-even") operation.

An odd amplifier and an even amplifier are used for an integrating DFE summer for continuous bi-modal operation. Such continuous bi-modal operation of an integrating half-rate DFE summer allows for a less than a one RC time constant integrating phase with no residual offset after a reset phase. Along those lines, such a continuous bi-modal operation integrating DFE summer may have no settling time. Because there is no settling time, less current may be used, namely less power consumption, as such current does not need to be significantly increased to reduce settling time for high-frequency operation.

Moreover, such an integrating DFE summer may be used in an decision feedback equalizer with a first DFE correction TAP unrolled, as time limited paths of such speculation or unrolling may be operated within UI limits therefor due to having a less than one RC time constant integrating phase. For high frequency operation, a first tap correction of an integrating DFE summer may be implemented by an unrolled feedback DFE. Conventionally, two separate continuous time DFE summers were operated in parallel, namely an EVEN path and an ODD path, at the expense of approximately a doubling of current consumption. However, even this ODD/EVEN path implementation may have a residual data dependent error.

To reduce data dependent error over such a conventional configuration, a bias current circuit common to both EVEN and ODD paths may be used with continuous bi-modal operation of an integrating half-rate DFE summer. Moreover, an additional benefit to this bias current circuit common to both EVEN and ODD paths implementation is a reduction in power consumption.

With the above description borne in mind, various configurations for a continuous bi-modal operation integrating DFE summer are generally described below.

Figure 5:
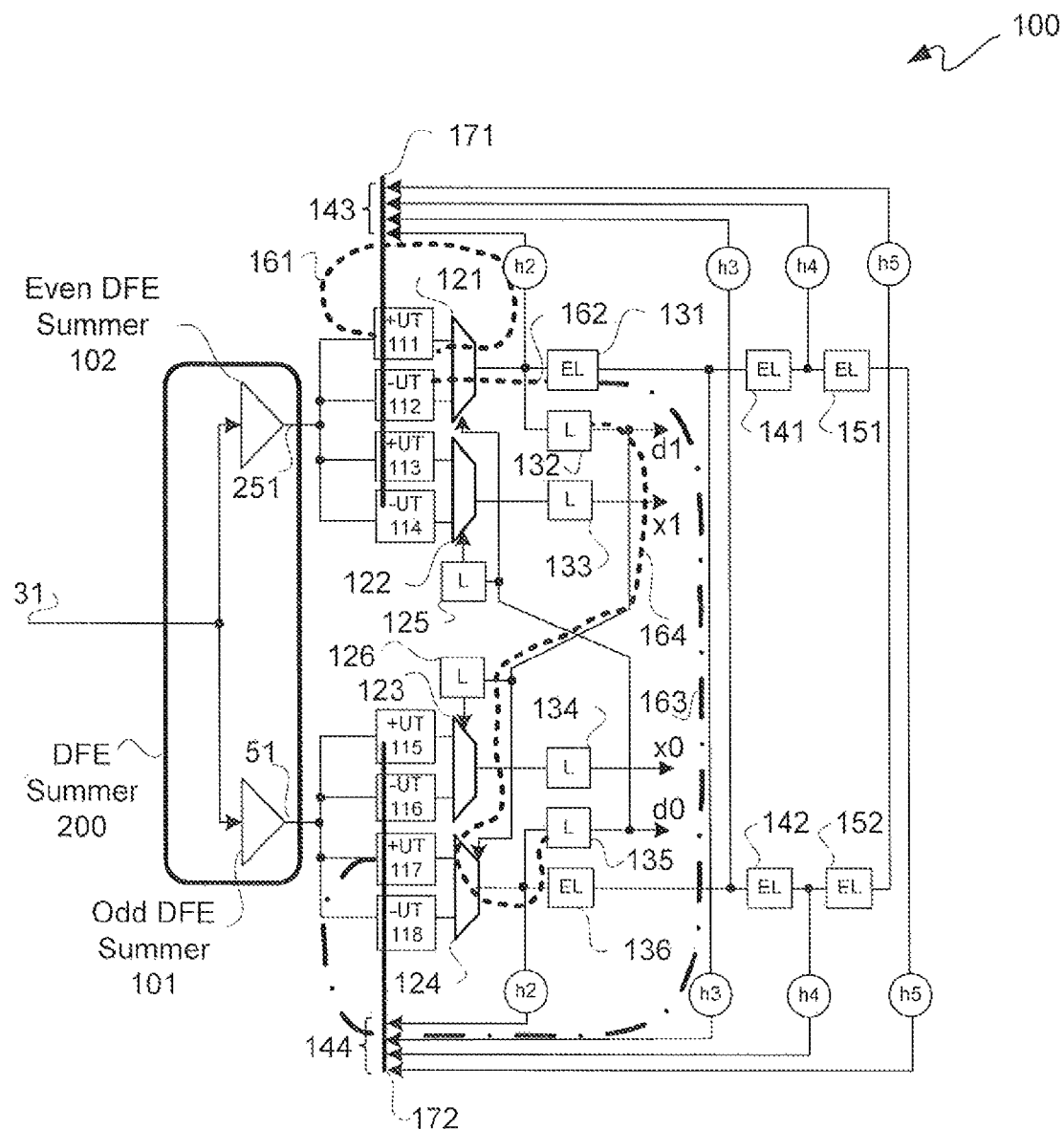
FIG. 5 is a schematic diagram depicting an exemplary portion of a half-rate decision feedback equalizer with a first tap correction unrolled.

Along those lines, FIG. 5 is a schematic diagram depicting an exemplary portion of an ODD-EVEN decision feedback equalizer 100 with a first tap correction unrolled. For purposes of clarity by way of example and not limitation, single lines are illustratively depicted in FIG. 5 for differential voltages, though not all lines in FIG. 5 are for differential voltages as shall be apparent from the following description.

A differential input 31 is provided to a DFE summer 200 of ODD-EVEN decision feedback equalizer 100. DFE summer 200 includes an even DFE summer 102 and an odd DFE summer 101, as described below in additional detail. Differential input 31 is simultaneously provided as inputs to both DFE summers 101 and 102; however, DFE summers 101 and 102 share a bias current circuit, as described below in additional detail though not illustratively depicted in DFE summer 200 of FIG. 5 for purposes of clarity and not limitation. Along those lines, DFE summer 200 is a single stage with two differential voltage output channels, as DFE summer 200 includes a common bias current circuit for both odd and even paths of DFE summer 200. Along those lines, differential output voltages of both channels may be fully reset by alternating or interleaving within such single stage integrating DFE summer 200, as described below in additional detail. Furthermore, current steering may be provided between two or more paths for an integrating DFE summer 200 or other time interleavable device, even though the following description is for a half-rate interleaving.

A differential voltage output from even DFE summer 102 may be provided to unit threshold ("UT") comparators 111 through 114, and a differential voltage output from odd DFE summer 101 may be provided to comparators 115 through 118. Comparators 111 through 118 may be latching comparators with a settable offset, such as a UT. Though an analog voltage, such as a differential voltage, may be input to comparators 111 through 118, outputs of comparators 111 through 118 are digital decisions, such as a logic 1 for a positive comparison result and a logic 0 for a negative comparison result for example. comparators 111 through 118 are part of an unrolling of a first correction TAP for providing odd data ("d1"), even data ("d0"), odd data crossing ("x1"), and even data crossing ("x0") values of a quadrature output, as described below in additional detail. To obtain a full-rate binary bitstream from two half-rate bitstreams, d0s and d1s may be interleaved, and x0s and x1s may be interleaved.

ODD/EVEN decision feedback equalizer 100 may be clocked for in phase opposition operation, though clock signals are not illustratively depicted for purposes of clarity and not limitation, and output even and odd data and crossing samples may be in quadrature. Moreover, a value of a UT may vary from operation to operation depending on size of swing of Vsw, as +UTs and −UTs are generally for determining where in amplitude of a differential voltage is. A UT may be the first correction TAP, and such a UT may be added by unrolling in order to meet high speed timing constraints. The value of a UT changes with an adaptation algorithm, but the value of a UT is not data dependent when operating in a steady state. Along those lines, voltage swing may generally be constant after adaptation is completed, namely generally once steady state operation is in effect.

Before a detailed description of unrolling circuitry of FIG. 5 is provided, a more detailed description of DFE summer 200 is provided for purposes of clarity.

Figure 6:
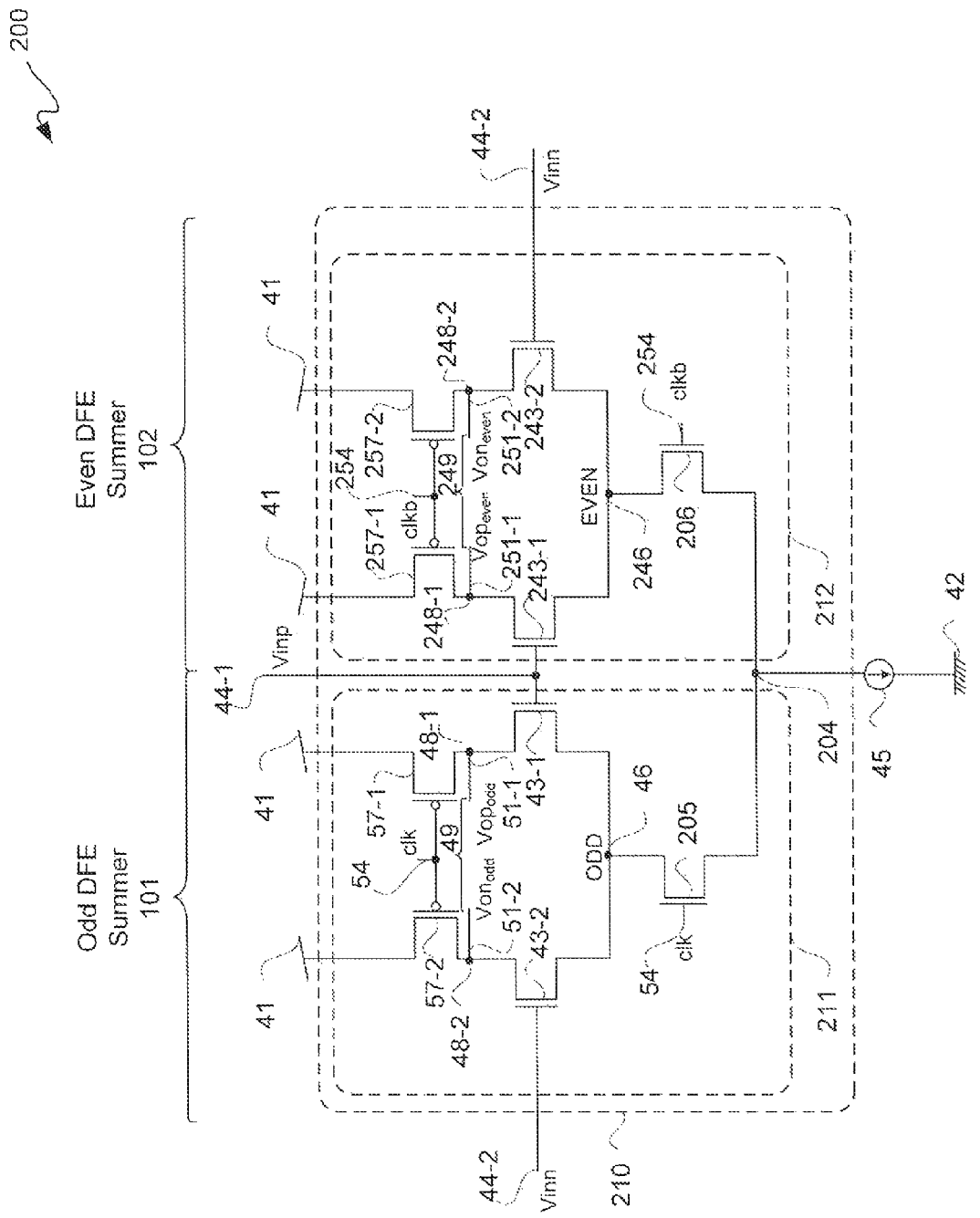
FIG. 6 is a schematic diagram depicting an exemplary amplifier for a continuous bi-modal operation integrating DFE summer.

FIG. 6 is a schematic diagram depicting an exemplary amplifier 210 for a continuous bi-modal operation DFE summer 200. DFE summer 200 is further described with simultaneous reference to FIGS. 4 through 6.

DFE summer 200 is coupled between a supply node 41 and a ground node 42. Input data 31 is an analog differential input, namely summer input, and input data is differentially provided to gates of two pairs of transistors.

In this example, NMOS and PMOS transistors are illustratively depicted; however, in another implementation NMOS and PMOS transistors may be reversed along with a reversal of supply and ground nodes. Along those lines, an input common-mode voltage is high, namely the higher of a supply voltage divided by two. However, if a common-mode voltage input was low, then a reversed polarity implementation may be used as indicated above.

By bi-modal operation, it is generally meant that during operation a portion of DFE summer 200 is in an integrating mode or phase and another portion of DFE summer is in a reset mode or phase. By continuous bi-modal operation, it is generally meant that DFE summer operates by interleaving odd and even operations without having to pause between such operations.

DFE summer 200 includes an odd DFE summer 101 and an even DFE summer 102. Along those lines, amplifier 210 is a single stage amplifier, with an "odd" amplifier 211 and an "even" amplifier 212 having a common current source circuit. For a continuous bi-modal operation, odd amplifier 211 is in a reset phase while even amplifier 212 is in an integrating phase, and odd amplifier 211 is in an integrating phase while even amplifier 212 is in a reset phase.

Odd amplifier 211 may be clocked with a clock signal 54, and even amplifier 212 may be clocked with a clock signal 254 which is the inverse of clock signal 54. In other words, clock signal 254 is the complement ("clkb") of clock signal 54 ("clk"). Clock signals 54 and 254 may be sourced from a same clock signal by bifurcation of such same clock signal, namely: one clock signal source is provided to an inverting clock buffering path for producing clock signal 254, and another clock signal source is provided to a non-inverting clock buffering path for producing clock signal 54. Accordingly, clock signals 54 and 254 may be the same clock signal though 180 degrees out-of-phase with respect to one another.

Odd DFE summer 101 may include odd amplifier 211 and a bias current circuit when operating in an integrating mode for such odd stage, and even DFE summer 102 may include even amplifier 212 and a same bias current circuit when operating in an integrating mode for such even stage. In other words, DFE summers 101 and 102 may be operationally defined, as described below in additional detail.

A positive input voltage side ("Vinp") 44-1 of differential voltage input data, such as input data 31, is provided to gates of transistors 43-1 and 243-1, respectively of amplifiers 211 and 212. A negative input voltage side ("Vinn") 44-2 of such differential voltage input data, such as input data 31, is provided to gates of transistors 43-2 and 243-2, respectively of amplifiers 211 and 212. Along those lines, transistors 43-1 and 243-1 may be commonly gated for receiving Vinp 44-1, and transistors 43-2 and 243-2 may be commonly gated for receiving Vinn 44-2.

Source nodes of NMOS transistors 43-1 and 43-2 and a drain node of NMOS transistor 205 all of odd amplifier 211 may be commonly connected at "odd" bias node 46 to periodically receive a bias current from current source 45. A gate of transistor 205 may be coupled to receive clock signal 54, and a source node of transistor 205 may be commonly connected to a source node of NMOS transistor 206 of even amplifier 212 at a current source node 204.

Source nodes of NMOS transistors 243-1 and 243-2 and a drain node of NMOS transistor 206 all of even amplifier 212 may be commonly connected at "even" bias node 246 to periodically receive a bias current from current source 45. A gate of transistor 206 may be coupled to receive clock signal 254.

Bias current from current source 45 may be coupled between ground node 42 and current source node 204. In this example, current source 45 is a fixed current source. However, in another implementation, current source 45 may be an adjustable current source.

Because transistors 205 and 206 are respectively clocked with out-of-phase clock signals 54 and 254, transistor 205 is in a substantially conductive state ("ON") when transistor 206 is in a substantially non-conductive state ("OFF"), and vice versa. Likewise, because transistors 57 and 257 are respectively clocked with out-of-phase clock signals 54 and 254, transistors 54 are ON when transistors 257 are OFF, and vice versa.

When bias current source 45 is electrically decoupled from source node 246 of even amplifier 212 by transistor 206, bias current source 45 is electrically coupled to source node 46 of odd amplifier 211 by transistor 205. Along those lines, odd amplifier 211 is in an integrating phase of operation when supplied with bias current from bias current source 45, and even amplifier 212 is in a reset phase of operation when deprived of bias current from bias current source 45.

Conversely, when bias current source 45 is electrically coupled to source node 246 of even amplifier 212 by transistor 206, bias current source 45 is electrically decoupled from source node 46 of odd amplifier 211 by transistor 205. Along those lines, odd amplifier 211 is in a reset phase of operation when not supplied with bias current from bias current source 45, and even amplifier 212 is in an integrating phase of operation when supplied with bias current from bias current source 45.

For odd amplifier 211, drain nodes 48-1 and 48-2 respectively of transistors 43-1 and 43-2 are respectively coupled to drain nodes of PMOS resistors 57-1 and 57-2. Drain nodes 48-1 and 48-2 may be for an odd amplifier 211 differential output 49 of positive side output voltage ("Vop$_{odd}$") and an odd stage negative side output voltage ("Von$_{odd}$"), as respectively associated with conductive lines or nodes 51-1 and 51-2.

Source nodes of a clocked reset switch or circuit 61 formed of PMOS transistors 57-1 and 57-2 may be commonly coupled at supply node 41. A differential output 49 from odd amplifier 211 of amplifier 210 may be sourced from drain nodes 48-1 and 48-2, or more generally DFE summer 200 odd amplifier 211 output nodes 48-1 and 48-2.

For even amplifier 212, drain nodes 248-1 and 248-2 respectively of transistors 243-1 and 243-2 are respectively coupled to drain nodes of PMOS resistors 257-1 and 257-2. Drain nodes 248-1 and 248-2 may be for an even amplifier 212 differential output 249 of positive side output voltage ("Vop$_{even}$") and negative side output voltage ("Von$_{even}$"), as respectively associated with positive side and negative side conductive lines or nodes 251-1 and 251-2.

Source nodes of a clocked reset switch or circuit 61 formed of PMOS transistors 257-1 and 257-2 may be commonly coupled at supply node 41. A differential output 249 from even amplifier 212 of amplifier 210 may be sourced from drain nodes 248-1 and 248-2, or more generally DFE summer 200 even amplifier 212 output nodes 248-1 and 248-2.

An odd-even integrating DFE summer 200 may be more power efficient than a continuous time DFE summer, for reasons as previously described. An odd-even integrating DFE summer 200 separately integrates an odd interval of a differential input and an even interval of such differential input with each integration performed within 1UI. As only either an odd interval output or an even interval output may be used at a time, odd and even intervals of a data input 31 may be segregated; however, a common bias current circuit may be used to reduce power consumption by switching such bias current to between odd and even paths.

Figure 7:
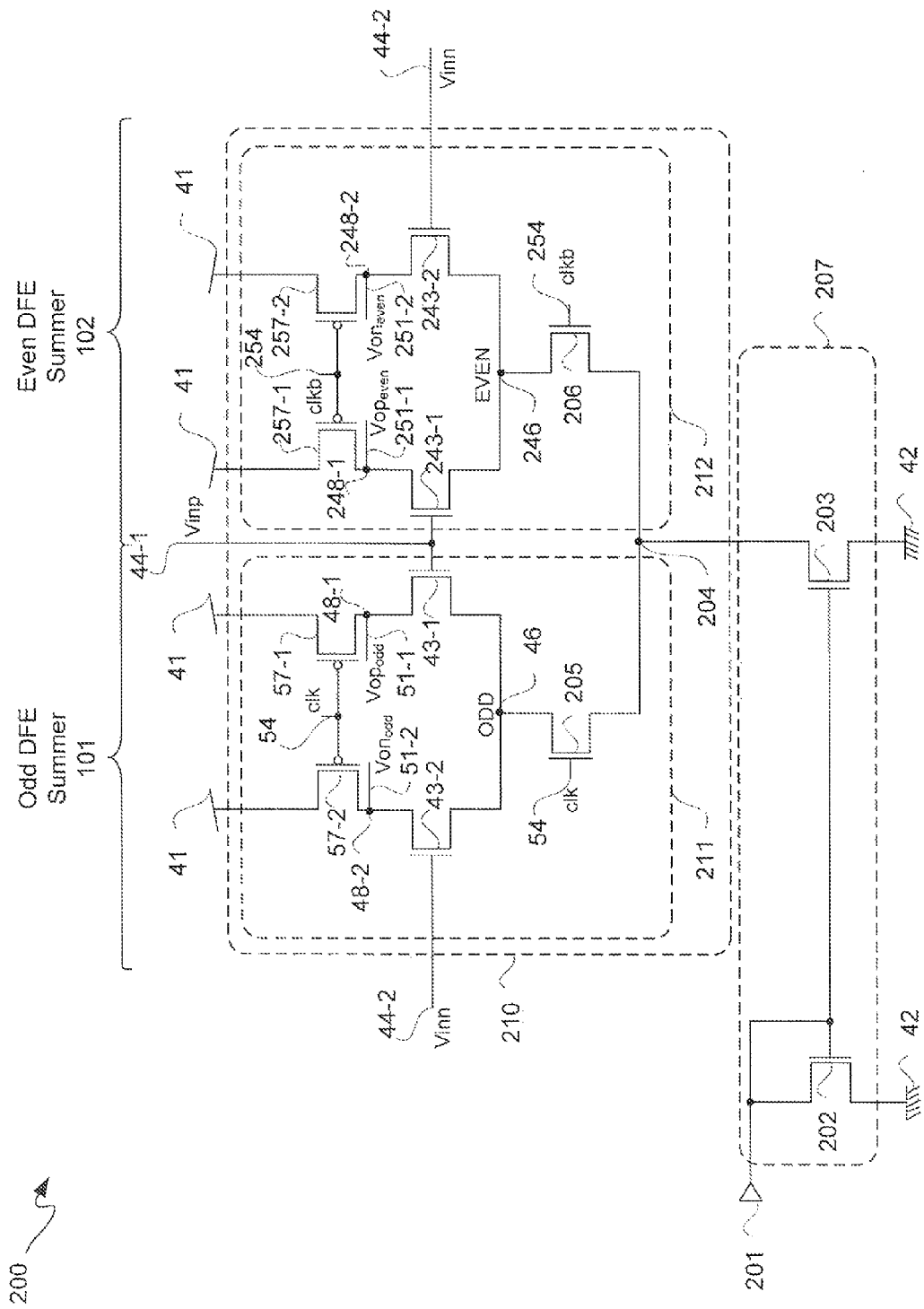
FIG. 7 is a schematic diagram depicting another exemplary amplifier for a continuous bi-modal operation integrating DFE summer.

FIG. 7 is a schematic diagram depicting another exemplary amplifier 210 for a continuous bi-modal operation DFE summer 200. Amplifier 210 is the same in FIGS. 6 and 7, except that current source 45 of FIG. 6 is replaced with a current mirror circuit ("current mirror") 207 in FIG. 7 for a current source circuit in common for odd and even amplifiers 211 and 212 of amplifier 210. Accordingly, some previously described details regarding DFE summer 200 are not repeated for purposes of clarity and not limitation.

Current mirror 207 includes NMOS transistors 202 and 203 in this example implementation. A bias voltage 201 may be provided to gates of transistors 202 and 203, which may be commonly coupled to receive such bias voltage 201. Source nodes of transistors 202 and 203 may be coupled to ground node 42. A drain node of transistor 202 may be coupled to receive bias voltage 201, and a drain node of transistor 203 may be coupled to current source node 204.

FIG. 8 is a flow diagram depicting an exemplary DFE summer operational flow 800 for DFE, such as for DFE summers 200 of FIGS. 6 and 7. Accordingly, DFE summer operational flow 800 is further described with simultaneous reference to FIGS. 4, 5, 6 and 7

At 801, an input differential signal, such as data input 31, may be obtained by a first integrating summer, such as odd DFE summer 101, and a second integrating summer, such as even DFE summer 102, having a bias current circuit, such as bias current source 45 or current mirror 207, in common. Even though both DFE summers 101 and 102 may simultaneously receive a same input differential signal, only one of such two DFE summers is in an integrating phase at a time, and the other of such two DFE summers is in a resetting phase during an integrating phase of the other DFE summer.

At 802, first integrating may be performed with odd DFE summer 101 during a first clock phase of a first clock signal, such as a high voltage interval of clock signal 54, for transconductance of data input 31 to a first output differential signal, such as a Vop-Von odd differential signal 49 at output nodes 48 of odd DFE summer 101. Even though the above description is in terms of positive logic, in another implementation negative logic may be used.

At 803, first resetting may be performed with even DFE summer 102 during such first clock phase of clock signal 54 for driving residual voltages of a second output differential signal, such as Vop-Von even differential signal 249 at output nodes 248 of even DFE summer 102, to the same voltage level, such as a voltage level of supply node 41. Thus, after resetting differential signal 249 is not differential, namely there is no operational difference between voltages at output nodes 248. Moreover, first integrating at 802 and first resetting at 803 are performed at the same time.

Though such operations may be described with reference to a same phase of clock signal 54, operationally first integrating and first resetting are respectively performed with reference to a phase of clock signal 54 and a corresponding phase of clock signal 254. Because clock signals 54 and 254 are at least approximately 180 degrees out-of-phase with respect to one another, integrating and resetting by an odd DFE summer 101 may be described with respective reference to high and low voltage phases of clock signal 54. Likewise, integrating and resetting by an even DFE summer 102 may be described with respective reference to high and low voltage phases of clock signal 254.

At 804, second integrating may be performed with even integrating summer 102 during a second clock phase of clock signal 54 for transconductance of data input 31 to the second output differential signal. At 805, second resetting may be performed with odd integrating summer 101 during the second clock phase of clock signal 54 for driving residual voltages of the first output differential signal, such as Vop-Von odd differential signal 49 at output nodes 48 of odd DFE summer 101, to the same voltage level, such as a voltage level of supply node 41. Thus, after resetting differential signal 49 is not differential, namely there is no operational difference between voltages at output nodes 48. Moreover, second integrating at 803 and second resetting at 804 are performed at the same time.

In other words, odd-even integrating-resetting takes place at the same time, and an odd-even integrating-resetting interval is immediately followed by even-odd integrating-resetting interval, where even-odd integrating-resetting takes place at the same time. Along those lines, integrating by on odd DFE summer 101 is interleaved or alternated with integrating with an even DFE summer 102, and resetting by an even DFE summer 102 is interleaved or alternated with resetting by an odd DFE summer 101. Thus, a combined data stream of odd and even integration results may be provided by interleaving such odd and even integration results with one another.

For first integrating at 802, operations at 811 and 812 may be performed at the same time for odd DFE summer 101. At 811, a bias current from a bias current circuit, such as bias current source 45 or bias current mirror 207, may be electrically coupled to an odd bias node 46 of a first amplifier, such as odd amplifier 211, of odd DFE summer 101. During an integrating phase of odd DFE summer 101, clock signal 54 is at a high voltage level, which means PMOS transistors 57 are OFF and NMOS transistor 205 is ON. At 812, the same voltage level, such as from supply node 41, may be electrically decoupled from output nodes 48 of a first pair of transistors, such as transistors 43, of the first amplifier, such as odd amplifier 211.

A bias current applied to bias current node 46, along with Vinn and Vinp applied to gates of transistors 43-2 and 43-1, respectively, allows for transconductance of such differential input signal to drain nodes 48-2 and 48-1, respectively, through a pair of transistors 43 for output on nodes 48 as a differential output voltage 49. This differential output 49 at drain nodes 48 may integrate or discharge through output capacitance of odd DFE summer 101, such as for an analog input to a dynamic comparator. However, for this integration to occur, output nodes 48 are electrically decoupled from supply node 41 by turning OFF PMOS transistors 57.

For first resetting at 803, operations 813 and 814 may be performed at the same time for even DFE summer 102. At 813, bias current from the bias current circuit, such as bias current source 45 or bias current mirror 207, may be electrically decoupled from an even bias node, such as even bias node 246, of a second amplifier, such as even amplifier 212, of even DFE summer 102. During a resetting phase of even DFE summer 102, clock signal 254 is at a low voltage level, namely opposite the state of clock signal 54, which means PMOS transistors 257 are ON, and NMOS transistor 206 is OFF.

At 814, the same voltage level, such as of supply node 41, may be electrically coupled to a second pair of transistors, such as transistors 243, of the second amplifier, such as even amplifier 212. In other words, supply voltage from supply node 41 may be coupled to drain nodes 248-1 and 248-2 respectively of transistors 243-1 and 243-2 respectively through channels of PMOS transistors 257-1 and 257-2. As bias current is cut-off from bias node 246, a differential input 31 applied to gates of transistors 243 is not transconducted to drain nodes 248. In other words, with no bias current, no differential output is transconducted from a differential input.

However, some residual charge from a previous differential output may be present on nodes 248 and/or conductive lines 251 during an initiation of a reset phase of even DFE summer 102. Any appreciable offset due to such residual charge, which may be stored for example in parasitic output capacitance, may be driven out by driving nodes 248 and conductive lines 251 to a same voltage level, namely a supply voltage level of supply node 41 such as an analog Vtt voltage level in this example. Because these nodes 248 and conductive lines 251 are at a same voltage level after resetting, there is no residual differential offset between them for operational purposes. By operational purposes, it is generally meant that if there is any offset remaining, such difference is negligible. Moreover, by driving output voltage nodes 248 and output conductive lines 251 to same voltage levels, a subsequent integrating operation may take place without any settling time, namely no pause needs to be asserted between consecutive odd and even integration operations.

For second integrating at 804, operations at 815 and 816 may be performed at the same time for even DFE summer 102. At 815, a bias current from a bias current circuit, such as bias current source 45 or bias current mirror 207, may be electrically coupled to an even bias node 246 of a second amplifier, such as even amplifier 212, of even DFE summer 102. During an integrating phase of even DFE summer 102, clock signal 254 is at a high voltage level, which means PMOS transistors 257 are OFF and NMOS transistor 206 is ON. At 816, the same voltage level, such as from supply node 41, from a second pair of transistors, such as transistors 243, of the second amplifier, such as even amplifier 212, may be electrically decoupled from output nodes 248.

A bias current applied to bias current node 246, along with Vinn and Vinp applied to gates of transistors 243-2 and 243-1, respectively, allows for transconductance of such differential input signal to drain nodes 248-2 and 248-1, respectively, through a pair of transistors 243 for output on nodes 248 as a differential output voltage 249. This differential output 249 at drain nodes 248 may integrate or discharge through output capacitance of even DFE summer 102, such as for an analog input to a dynamic comparator. However, for this integration to occur, output nodes 248 are electrically decoupled from supply node 41 by turning OFF PMOS transistors 257.

For second resetting at 805, operations 817 and 818 may be performed at the same time for odd DFE summer 101. At 813, bias current from the bias current circuit, such as bias current source 45 or bias current mirror 207, may be electrically decoupled from an odd bias node, such as odd bias node 46, of a second amplifier, such as odd amplifier 211, of odd DFE summer 101. During a resetting phase of odd DFE summer 101, clock signal 54 is logic at a low voltage level, namely opposite the state of clock signal 254, which means PMOS transistors 57 are ON and NMOS transistor 205 is OFF.

At 818, the same voltage level, such as of supply node 41, may be electrically coupled to a second pair of transistors, such as transistors 43, of the second amplifier, such as odd amplifier 211. In other words, supply voltage from supply node 41 may be coupled to drain nodes 48-1 and 48-2 respectively of transistors 43-1 and 43-2 respectively through channels of PMOS transistors 57-1 and 57-2. As bias current is cut-off from bias node 46, a differential input applied to gates of transistors 43 is not transconducted to drain nodes 48. In other words, with no bias current, no differential output is transconducted from a differential input. However, some residual charge from a previous differential output may be present on nodes 48 and/or conductive lines 51 during an initiation of a reset phase of odd DFE summer 101.

Any offset effect due to such residual charge, which may be stored for example in parasitic output capacitance, may be driven out by driving nodes 48 and conductive lines 51 to a same voltage level, namely a supply voltage level of supply node 41 such as an analog Vtt voltage level in this example. Because these nodes 48 and conductive lines 51 are at a same voltage level after resetting, there is no residual differential offset between them for operational purposes. Moreover, by driving output voltage nodes 48 and output conductive lines 51 to same voltage levels, a subsequent integrating operation may take place without any settling time between consecutive integrating operations.

Accordingly, bias current may be steered between two integrating summers, removing or decoupling such bias current from one of such integrating summers during a reset phase to allow for true reset during such reset phase. By having odd-even integrating and resetting operations simultaneously performed interleaved with even-odd resetting and integrating operations simultaneously performed as previously described, DFE summer 200 may thus have no settling time between odd and even integrating operations. Moreover, DFE summer 200 may have no residual offset along without any settling time. Such odd and even integrating operations, as well as corresponding even and odd resetting operations, may be performed in alternating sequence one after another without memory effects due to residual charge reaching an operational level. Thus, each integrating operation of DFE summer 200 may be substantially within a UI for high-frequency operations, as delay is generally limited only by transconductance and propagation delay of differential input to differential output.

To recapitulate with reference to FIG. 7 only for purposes of clarity and not limitation, amplifier 210 is biased by an input current from bias voltage 201. As gate and drain nodes of NMOS transistor 202 are tied to a gate node of NMOS transistor 203, and transistors 202 and 203 share a same source voltage of ground node 42, input current from bias voltage 201 is mirrored to a drain node of transistor 203. Current mirror 207 thus may provide a biasing current used by amplifier 210 for operation thereof, as previously described, where transistor 203 is a tail device operating as a current sink.

Coupled on top of a biasing current sink is a differential pair formed by NMOS transistors 205 and 206. A gate of transistor 205 is coupled to an input clock signal 54, and a gate of transistor 206 is coupled to an input clock 254, namely a complementary version of clock signal 54. Having clock signals 54 and 254 phase shifted by 180 degrees allows current supplied by a tail device, such as transistor 203 in this example, to be steered between drains of transistors 205 and 206 in each clock cycle, namely to either a drain of transistor 205 or a drain of transistor 206 depending on whether clock signal 54 is high or low. When clock signal 54 is high, clock signal 254 is low, and so current from transistor 203 flows through a channel of transistor 205 to an odd integrating DFE summer, namely odd amplifier 211. When clock signal 254 is high, clock signal 54 is low, and so current from transistor 203 flows through a channel of transistor 206 to an even integrating DFE summer, namely even stage 212.

These even and odd integrating DFE summers, namely even and odd stages 212 and 211, have the same structure, and their operations are interleaved in time. Accordingly for purposes of clarity and not limitation, only odd amplifier 211 description of recapitulated. For odd amplifier 211, input signals of a differential input 31 are respectively applied to gates of transistors 43, where transistors 43 are connected as a differential pair. When clock signal 54 is high, transistors 42 steer current from transistor 203 between output nodes 48.

PMOS transistors 57 are switches electrically coupling output nodes 48 of odd amplifier 211 to supply node 41 when clock signal 54 is low for a reset phase. This reset phase is to allow any residual voltage on output nodes 48 to be discharged, where such residual voltage may be from a differential current from transistors 43 differential pair when clock signal 54 was high. As a current in drain of transistor 43-1 may be different than a current in a drain of transistor 43-2, voltages Vop_odd and Von_odd may be differential voltage which is integrated in odd amplifier 211 during an integrating phase when clock signal 54 is high.

Returning to FIG. 5 with continued reference to FIGS. 6 and 7, output nodes 48-1 and 48-2 for an odd stage differential output respectively coupled to a positive side conductive line 51-1 and a negative side conductive line 51-2 may be for providing an odd DFE summer 101 output for an odd path signal, namely via conductive lines 51, for subsequent sampling. Likewise, output nodes 248-1 and 248-2 for an even stage differential output respectively coupled to a positive side conductive line 251-1 and a negative side conductive line 251-2 may be for providing an even DFE summer 102 output for an even path signal, namely via conductive lines 251, for subsequent sampling. An odd path differential output may be provided via conductive lines 51 to each of comparators 115 through 118 for sampling, and an even path differential output may be provided via conductive lines 251 to each of comparators 111 through 114.

A positive UT may be compared against a sampled differential voltage output by comparators 111, 113, 115, and 117, and a negative UT may be compared by a sampled differential voltage output by comparators 112, 114, 116, and 118. Accordingly, such comparators 111 through 118 may be set with a UT value, namely a first correction TAP value. Alternatively, comparators 111 through 118 may be thought of as data slicers. Along those lines, differential voltages output by DFE summers 101 and 102 may be non-return-to-zero ("NRZ") voltages or other differential signaling.

Comparators 111 and 112 may be for a clock 0 degree sampling point; comparators 113 and 114 may be for a clock 90 degree sampling point; comparators 115 and 116 may be for a clock 270 degree sampling point; and comparators 117 and 118 may be for a clock 180 degree sampling point. Outputs of comparators 111 through 118 may be single-ended digital values, namely either a logic 1 or 0 voltage level, such as Vcc and ground for example.

Outputs of comparators 111 and 112 may be data inputs to multiplexer 121, and outputs of comparators 113 and 114 may be data inputs to multiplexer 122. Outputs of comparators 115 and 116 may be data inputs to multiplexer 123, and outputs of comparators 117 and 118 may be data inputs to multiplexer 124.

A control select signal input to multiplexer 121 may be output of register or latch ("L") 135 triggered responsive to a clock 0 degree sampling point. A control select signal input to multiplexer 122 may be output of register or latch ("L") 125 triggered responsive to a clock 90 degree sampling point, where input to latch 125 is sourced from output of latch 135.

A control select signal input to multiplexer 124 may be output of register or latch ("L") 132 triggered responsive to a clock 180 degree sampling point. A control select signal input to multiplexer 123 may be output of register or latch ("L") 126 triggered responsive to a clock 270 degree sampling point, where input to latch 126 is sourced from output of latch 132.

Output of multiplexer 121 may be provided as an odd path 143 h2 coefficient or weight for DFE feedback, as well as being a data input to latch 132 and a rising edge triggered register or latch ("EL") 131 triggered responsive to a clock 180 degree sampling point. Output of multiplexer 122 may be provided as a data input to latch 133, which latch 133 may be triggered responsive to a clock 270 degree sampling point.

Output of multiplexer 124 may be provided as an even path 144 h2 coefficient or weight for DFE feedback, as well as being a data input to latch 135 and a falling edge triggered register or latch ("EL") 136 triggered responsive to a clock 0 degree sampling point. Output of multiplexer 123 may be provided as a data input to latch 134, which latch 134 may be triggered responsive to a clock 90 degree sampling point.

Odd outputs of latches 132 and 133 respectively are data-one ("d1") and crossing-one ("x1") samples. Even outputs of latches 135 and 134 respectively are data-zero ("d0") and crossing-zero ("x0") samples.

Output of latch 131 may be provided as an even path 144 h3 coefficient or weight for DFE feedback, as well as being a data input to latch 141, which latch 141 may be triggered responsive to a clock 0 degree sampling point. Output of latch 141 may be provided as an odd path 143 h4 coefficient or weight for DFE feedback, as well as being a data input to latch 151, which latch 151 may be triggered responsive to a clock 180 degree sampling point. Output of latch 151 may be provided as an even path 144 h5 coefficient or weight for DFE feedback.

Output of latch 136 may be provided as an odd path 143 h3 coefficient or weight for DFE feedback, as well as being a data input to latch 142, which latch 142 may be triggered responsive to a clock 0 degree sampling point. Output of latch 142 may be provided as an even path 144 h4 coefficient or weight for DFE feedback, as well as being a data input to latch 152, which latch 152 may be triggered responsive to a clock 180 degree sampling point. Output of latch 152 may be provided as an odd path 143 h5 coefficient or weight for DFE feedback.

Odd path 143 h2 through h5 coefficients may be bussed on bus 171 to comparators 111 through 114 for adjustment of a UT magnitude in accordance with DFE. Likewise, even path 144 h2 through h5 coefficients may be bussed on bus 172 to comparators 115 through 118 for adjustment of a UT magnitude in accordance with DFE.

Timing paths for such unrolling may be limiting. For example, a feedback path 161 from comparator 111 for an odd path 143 h2 coefficient back to comparator 111 may be limited to less than 2 UIs. A feedback path 162 from latch 131 to comparator 112 may be limited to less than 2 UIs. A feedback path 163 from latch 131 for an even path 144 h3 coefficient back to comparator 117 may be limited to less than 3 UIs. A feedback path 164 from latch 132 for loading latch 135 with an even path 144 h2 coefficient may be limited to less than 1UI.

Figure 9:
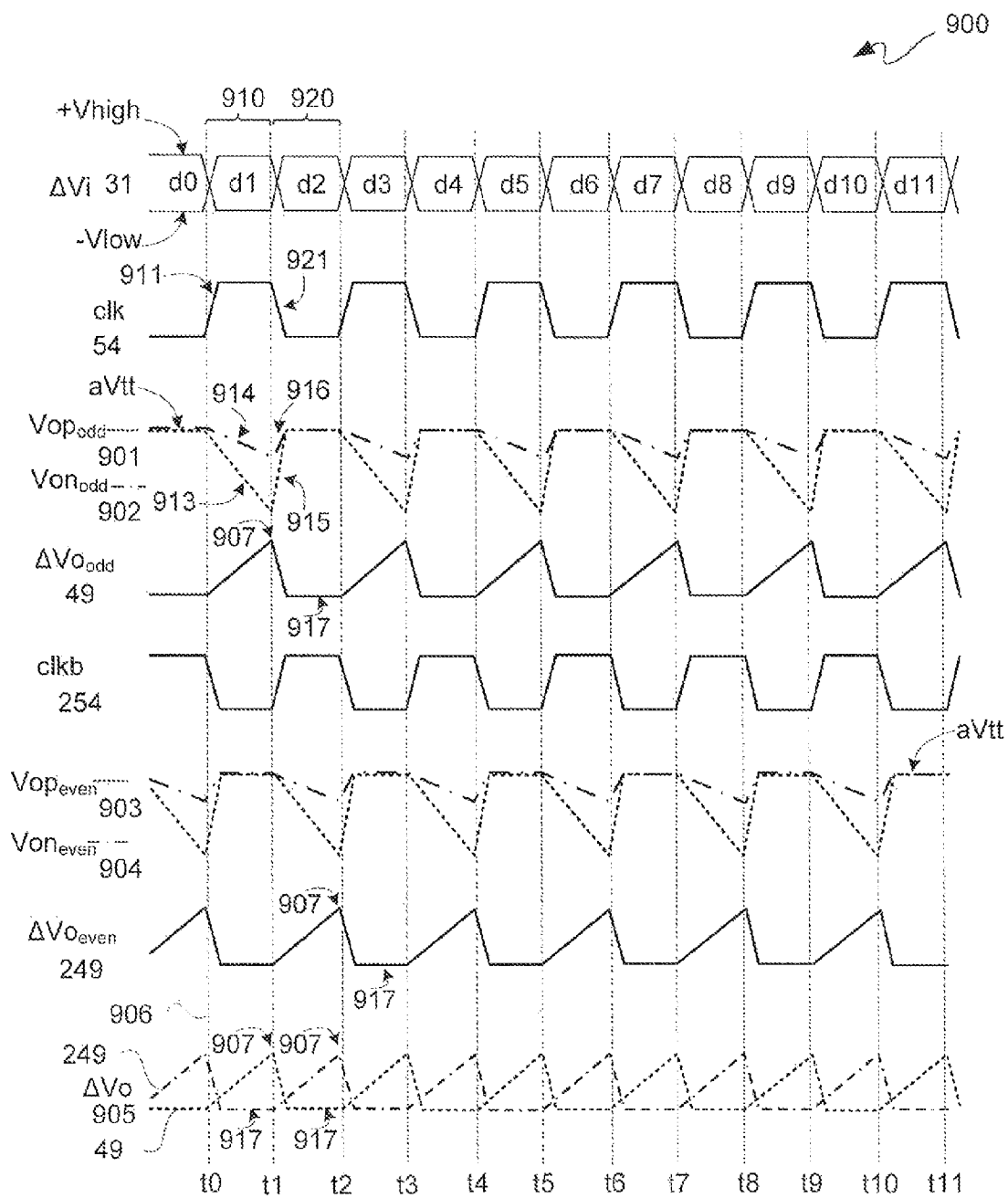
FIG. 9 is a signal diagram depicting exemplary waveforms for signals of DFE summers of FIGS. 6 and 7.

FIG. 9 is a signal diagram depicting exemplary waveforms 900 for signals of DFE summers 200 of FIGS. 6 and 7. Differential data input 31, ΔVi, includes differential data d0 through d11 for purposes of example; however, fewer or more differential data may be used. Along those lines, differential output is sampled at instants t0 through t11 for obtaining digital data from differential data d0 through d11, respectively. Sampling times or instants t0 through t11 coincide with integrating DFE summer 200 differential output peaks 907, as generally indicated with vertical dashed lines 906. Output peaks 907 may be for a full differential swing voltage, Vsw, to a high side thereof, and likewise valleys 917 may be for a full differential swing voltage, Vsw, to a low side thereof.

For clock signal 54 transitioning from low to high generally at 911, PMOS transistors 57 are transitioning from ON to OFF, and NMOS transistor 205 is transitioning from OFF to ON. Accordingly, bias current is steered to NMOS transistors 43 for passing through such differential pair for transconducting data d1 of data input 31 to drain nodes 48-1 and 48-2. This causes voltages Vop_odd 901 and Von_odd 902 to be drawn down from a supply voltage level within a time interval or bit period 910 generally associated with clock signal 54 being at a logic high level. In this integrating phase, current passing through transistors may come from output capacitance associated with output nodes 48 discharging with different currents on positive and negative sides. This discharge generally linearly causes voltages Vop_odd 901 and Von_odd 902 to decrease, generally respectively at 913 and 914, during time interval 910. Time interval 910 may be a half-period of clock signal 54, namely 1UI.

After time interval 910, clock signal 54 transitions from high to low generally at 921 in a next UI, namely time interval 920. Accordingly, NMOS transistor 205 is transitioned from ON to OFF for electrically decoupling bias current from transistors 43, and PMOS transistors 57 are transitioned from OFF to ON for coupling output nodes 48 to a supply voltage of supply node 41. Thus, voltages Vop_odd 901 and Von_odd 902 respectively at output nodes 48-1 and 48-2 are generally linearly pulled up, generally at 915 and 916 respectively, to and maintained at such supply voltage level during time interval 920.

Along the above lines, voltages Vop_odd 901 and Von_odd 902 may be combined to provide an odd differential voltage output, ΔVo_odd, 49, having peaks 907 for during an odd integrating phase and valleys 917 during an odd reset phase. This cycle may repeat for other odd data values, such as d3, d5, d7, etc.

As clock signal 254, voltages Vop_even 903 and Von_even 904, and ΔVo_even 249 have the same operation though on alternating phases of clock signal 54, namely high and low states of clock signal 254, operation associated with such signals follows from the above description and is not provided in unnecessary detail for purposes of clarity and not limitation. Moreover, even though each instance of Vop_odd 901 drops lower than each instance of Von_odd 902 in this example, Von_odd 902 may drop lower than Vop_odd 901 as will vary with data of data input 31. Likewise, even though each instance of Vop_even 903 drops lower than each instance of Von_even 904 in this example, Von_even 904 may drop lower than Vop_even 903 as will vary with data of data input 31. The example of all differential data effectively being a logic 1 for data input 31, though in NRZ for +Vhigh and −Vlow levels, is for purposes of clarity and not limitation.

Odd differential voltage output 49 and even differential voltage output 249 may be combined or interleaved to provide a full-rate differential output voltage, ΔVo, 905 from such half-rate differential voltage outputs. Full-rate differential output voltage 905 is for a full bitstream of NRZ differential data input 31, where differential voltage outputs 49 and 249 are for separate interleavable halves of such full bitstream.

Such differential output voltage 905 does not have a settling period between peaks 907 thereof, and each peak 907 may be resolved within 1UI. Accordingly, voltage dependent problem previously described is resolved by removing a bias current from a differential gm-pair (i.e., pair of transistors) during a reset phase. Without differential current, no differential voltage is generated at differential output nodes, and output voltages may be truly reset to aVtt. More specifically, a biasing current is steered from an even DFE summer to an odd DFE summer during an even DFE summer reset phase and odd DFE summer integrating phase, and then this steering of biasing current is reversed in a next bit period where the same current source circuit is used for both even and odd paths. Along those lines, power consumption for a conventional separate odd and even continuous time DFE summers is approximately a multiple of 6 times larger than power consumption for integrating-resetting DFE summer 200.

Figure 10:
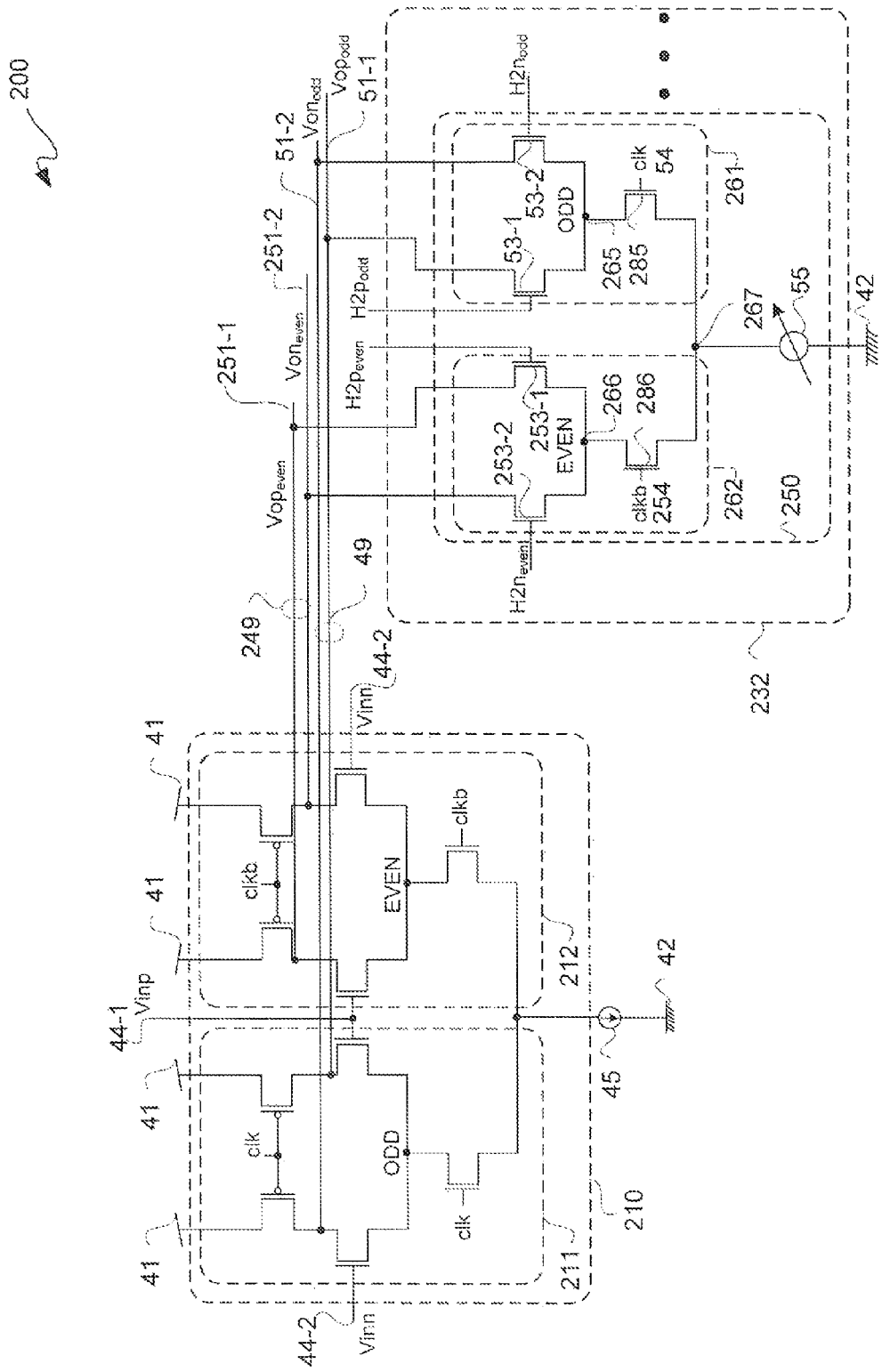
FIG. 10 is a schematic diagram depicting another exemplary integrating DFE summer.

FIG. 10 is a schematic diagram depicting another exemplary integrating DFE summer 200. FIG. 10 is further described with simultaneous reference to FIGS. 4 through 7.

Rather than unrolling a first correction TAP, such as in FIG. 5, one or more correction TAPs for forming a chain of correction TAPs 232 may be used. However, rather than current steering circuits 50 forming a chain of correction TAPs, each with a single pair of transconductance transistors 43 as in FIG. 4, chain of correction TAPs 232 may be formed of one or more integrating bi-modal current steering circuits 250 coupled to amplifier 210 and coupled to a delay chain (not shown in this FIG. 10 for purposes of clarity and not limitation) for feedback input, such feedback was previously described.

Along those lines, an amplifier 210, such as previously described, may have an odd amplifier 211 for providing an odd differential output voltage 49 and an even amplifier 212 for providing an even differential output voltage 249. Each bi-modal current steering circuit 250 may include an odd amplifier 261, an even amplifier 262, and an adjustable current source 55 in common to such odd and even amplifiers 261 and 262.

Odd amplifier 261 and even amplifier 262 may have the same structure as odd amplifier 211 and even amplifier 212, respectively, except PMOS transistors 57 and 257 of amplifier 210 may be common or shared among one or more current steering circuits 250 for odd and even resetting phases thereof. For a continuous bi-modal operation, odd amplifier 261 is in a reset phase while even amplifier 262 is in an integrating phase, and odd amplifier 261 is in an integrating phase while even amplifier 262 is in a reset phase. Again, in this example, NMOS and PMOS transistors are illustratively depicted; however, in another implementation NMOS and PMOS transistors may be reversed along with a reversal of supply and ground nodes. Parasitic capacitances are not illustratively depicted in this figure, but follow from the above description of parasitic capacitances for DFE summer 60 of FIG. 4.

Odd amplifier 261 may be clocked with a clock signal 54, and even amplifier 262 may be clocked with a clock signal 254 which is the inverse of clock signal 54. In other words, clock signal 254 is the complement ("clkb") of clock signal 54 ("clk"), as previously described.

For an $H_N$ correction TAP, for example an $H_2$ correction TAP, an odd and an even positive voltage side of differential voltage output data fed back, such as H2p_odd and H2p_even, may be respectively provided to gates of transistors 53-1 and 253-1 respectively of amplifiers 261 and 262; and an odd and an even negative voltage side of such differential voltage output data fed back, such as H2n_odd and H2n_even, may be respectively provided to gates of transistors 53-2 and 253-2 respectively of amplifiers 261 and 262. Thus, a differential feedback may include an H2p_odd and an H2n_odd differential voltage during an odd interval of such feedback and an H2p_even and an H2n_even differential voltage during an even interval of such feedback.

Source nodes of NMOS transistors 53-1 and 53-2 and a drain node of NMOS transistor 285 all of odd amplifier 261 may be commonly connected at "odd" bias node 265 to periodically receive an adjustable bias current from adjustable current source 55. A gate of transistor 285 may be coupled to receive clock signal 54, and a source node of transistor 285 may be commonly connected to a source node of NMOS transistor 286 of even amplifier 262 at a current source node 267.

Source nodes of NMOS transistors 253-1 and 253-2 and a drain node of NMOS transistor 286 all of even amplifier 262 may be commonly connected at "even" bias node 266 to periodically receive a bias current from adjustable current source 55. A gate of transistor 286 may be coupled to receive clock signal 254.

A bias current from adjustable bias current source 55 may be coupled between ground node 42 and current source node 267. Because transistors 285 and 286 are respectively clocked with complementary out-of-phase clock signals 54 and 254, transistor 285 is in a substantially conductive state ("ON") when transistor 286 is in a substantially non-conductive state ("OFF"), and vice versa. Likewise, as previously described, because transistors 57 and 257 are respectively clocked with complementary out-of-phase clock signals 54 and 254, transistors 54 are ON when transistors 257 are OFF, and vice versa.

When adjustable bias current source 55 is electrically decoupled from source node or bias node 266 of even amplifier 262 by transistor 286, adjustable bias current source 55 is electrically coupled to source node or bias node 265 of odd amplifier 261 by transistor 285. Along those lines, odd amplifier 261 is in an integrating phase of operation when supplied with bias current from adjustable bias current source 55, and even amplifier 262 is in a reset phase of operation when deprived of bias current from adjustable bias current source 55.

Conversely, when bias adjustable current source 55 is electrically coupled to source node 266 of even amplifier 262 by transistor 286, bias adjustable current source 55 is electrically decoupled from source node 265 of odd amplifier 261 by transistor 285. Along those lines, odd amplifier 261 is in a reset phase of operation when not supplied with bias current from bias adjustable current source 55, and even amplifier 262 is in an integrating phase of operation when supplied with bias current from bias adjustable current source 55.

For odd amplifier 261, drain nodes of transistors 53-1 and 53-2, which may be respectively common with drain nodes 48-1 and 48-2 of transistors 43-1 and 43-2, are respectively coupled to drain nodes of PMOS resistors 57-1 and 57-2. Drain nodes of transistors 53-1 and 53-2 for an odd amplifier 261 may be coupled to differential output 49 on a positive side output voltage ("$Vop_{odd}$") and an odd stage negative side output voltage ("$Von_{odd}$"), respectively, as respectively associated with conductive lines or nodes 51-1 and 51-2. A differential output from odd amplifier 261 may be applied to drain nodes 48-1 and 48-2.

For even amplifier 262, drain nodes of transistors 253-1 and 253-2, which may be respectively common with drain nodes 248-1 and 248-2 of transistors 253-1 and 253-2, are respectively coupled to drain nodes of PMOS resistors 257-1 and 257-2. Drain nodes of transistors 253-1 and 253-2 for even amplifier 262 may be coupled to a differential output 249 of positive side output voltage ("$Vop_{even}$") and negative side output voltage ("$Von_{even}$"), respectively, as respectively associated with positive side and negative side conductive lines or nodes 251-1 and 251-2. A differential output from even amplifier 262 may be applied to drain nodes 248-1 and 248-2.

An odd-even integrating DFE summer 200 may be more power efficient than a continuous time DFE summer by steering bias current to odd amplifier 261 and odd amplifier 211 in one bit period and then steering bias current to even amplifier 262 and even amplifier 212 in a next bit period for reasons as previously described. An odd-even integrating DFE summer 200 separately integrates an odd interval of a differential input and an even interval of such differential input with each integration performed within 1UI.

As only either an odd interval output or an even interval output may be used at a time, odd and even intervals of a data input 31 may be segregated; however, a common bias current circuit and one or more common adjustable bias current sources 44 may be used to reduce power consumption by switching such bias currents back and forth between odd and even paths. Other details for interleaved operation of integrating and resetting of odd amplifier 261 and even amplifier 262 follow from the above description of operation of odd amplifier 211 and even amplifier 212, respectively, and thus are not repeated for purposes of clarity and not limitation.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 11:
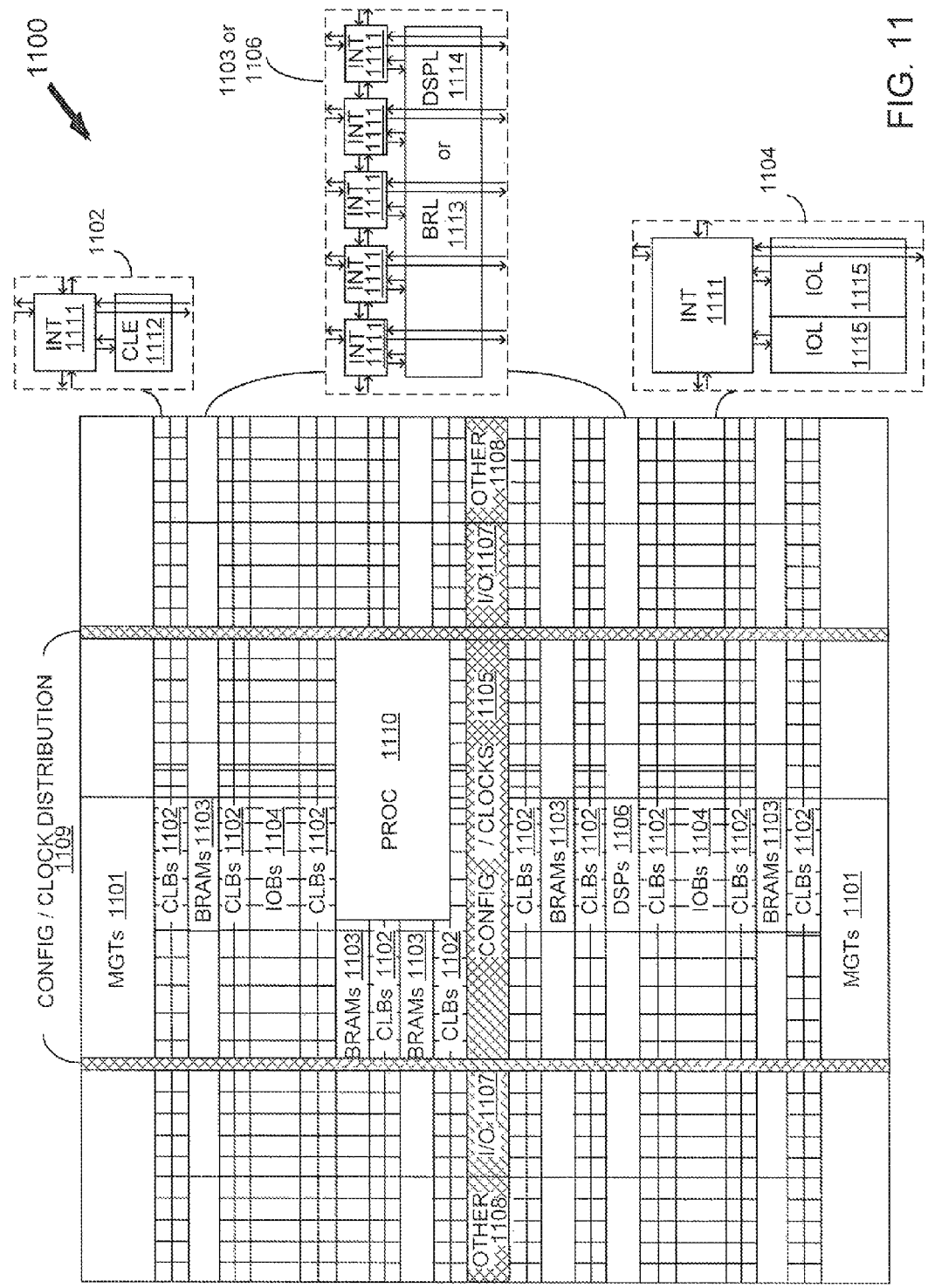
FIG. 11 is a simplified block diagram depicting an exemplary columnar Field Programmable Gate Array ("FPGA") architecture.

As noted above, advanced FPGAs can include several different types of programmable logic blocks in the array. For example, FIG. 11 illustrates an FPGA architecture 1100 that includes a large number of different programmable tiles including multi-gigabit transceivers ("MGTs") 1101, configurable logic blocks ("CLBs") 1102, random access memory blocks ("BRAMs") 1103, input/output blocks ("IOBs") 1104, configuration and clocking logic ("CONFIG/CLOCKS") 1105, digital signal processing blocks ("DSPs") 1106, specialized input/output blocks ("I/O") 1107 (e.g., configuration ports and clock ports), and other programmable logic 1108 such as digital clock managers, analog-to-digital converters, system monitoring logic, and so forth. Some FPGAs also include dedicated processor blocks ("PROC") 1110.

In some FPGAs, each programmable tile includes a programmable interconnect element ("INT") 1111 having standardized connections to and from a corresponding interconnect element in each adjacent tile. Therefore, the programmable interconnect elements taken together implement the programmable interconnect structure for the illustrated FPGA. The programmable interconnect element 1111 also includes the connections to and from the programmable logic element within the same tile, as shown by the examples included at the top of FIG. 11.

For example, a CLB 1102 can include a configurable logic element ("CLE") 1112 that can be programmed to implement user logic plus a single programmable interconnect element ("INT") 1111. A BRAM 1103 can include a BRAM logic element ("BRL") 1113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 1106 can include a DSP logic element ("DSPL") 1114 in addition to an appropriate number of programmable interconnect elements. An IOB 1104 can include, for example, two instances of an input/output logic element ("IOL") 1115 in addition to one instance of the programmable interconnect element 1111. As will be clear to those of skill in the art, the actual I/O pads connected, for example, to the I/O logic element 1115 typically are not confined to the area of the input/output logic element 1115.

In the pictured embodiment, a horizontal area near the center of the die (shown in FIG. 11) is used for configuration, clock, and other control logic. Vertical columns 1109 extending from this horizontal area or column are used to distribute the clocks and configuration signals across the breadth of the FPGA.

Some FPGAs utilizing the architecture illustrated in FIG. 11 include additional logic blocks that disrupt the regular columnar structure making up a large part of the FPGA. The additional logic blocks can be programmable blocks and/or dedicated logic. For example, processor block 1110 spans several columns of CLBs and BRAMs.

Note that FIG. 11 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 11 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. For example, even though the above-description was in terms of half-rate DFE for purposes of clarity, more than two phases may be used in accordance with the above-description. Along those lines, a one third-rate, a one quarter-rate, or other fractional-rate operation may be used for current steering as described herein. Thus, speed of operation may be increased, along with a reduction in power consumption, for time-interleaved amplifiers and/or time-interleaved comparators, which may include analog-to-digital converters and/or digital-to-analog converters. Moreover, high-speed track and hold circuits may be biased with current steering as described herein.

Claims listing steps do not imply any order of the steps. Trademarks are the property of their respective owners.

What is claimed is:

1. A decision feedback equalizer, comprising:
a first integrating summer and a second integrating summer each configured to receive an input differential signal;
a bias current circuit connected to first and second current steering transistors and configured to:
provide, using only the first current steering transistor of the first and second current steering transistors, a bias current to the first integrating summer during a first clock phase of a first clock signal; and
provide, using only the second current steering transistor of the first and second current steering transistors, the bias current to the second integrating summer during a first clock phase of a second clock signal;
the first integrating summer configured for integrating during the first clock phase of the first clock signal for transconductance of the input differential signal to a first output differential signal and for resetting during a second clock phase of the first clock signal for driving residual voltages of the first output differential signal to a same voltage level;
a first pair of conductive lines coupled to the first integrating summer for propagating the integrating and the resetting of the first output differential signal;
the second integrating summer configured for integrating during the first clock phase of the second clock signal for transconductance of the input differential signal to a second output differential signal and for resetting during a second clock phase of the second clock signal for driving residual voltages of the second output differential signal to the same voltage level;
a second pair of conductive lines coupled to the second integrating summer for propagating the integrating and the resetting of the second output differential signal;
the first clock signal and the second clock signal configured to be out of phase with respect to one another for interleaving the first output differential signal and the second output differential signal;
a current steering circuit configured with a first amplifier and a second amplifier respectively coupled to the first pair of conductive lines and the second pair of conductive lines; and
the current steering circuit having an adjustable bias current source in common between the first amplifier and the second amplifier.

2. The decision feedback equalizer according to claim 1, wherein the first integrating summer and the second integrating summer respectively comprise a third amplifier and a fourth amplifier; wherein the third amplifier and the fourth amplifier each comprising:
a first pair of transistors of a first polarity type coupled to one another at source nodes thereof and having gates configured for respectively receiving a positive side and a negative side of the input differential signal;
the first pair of transistors configured for the transconductance of the input differential signal to first drain nodes thereof;
a third transistor of the first polarity type having a drain node coupled to the source nodes of the first pair of transistors and having a source node coupled to the bias current circuit, wherein the third transistor is one of the first and second current steering transistors;
a second pair of transistors of a second polarity type having source nodes configured for receiving the same voltage level and having second drain nodes respectively coupled to the first drain nodes of the first pair of transistors; and
gates of the third transistor and the second pair of transistors configured for receiving either the first clock signal or the second clock signal respectively for the first integrating summer and the second integrating summer.

3. The decision feedback equalizer according to claim 2, wherein the third amplifier and the fourth amplifier are respectively coupled to first differential output lines and second differential output lines at the first drain nodes of the first pair of transistors respectively thereof and are respectively configured for providing the first output differential signal and the second output differential signal respectively via the first differential output lines and the second differential output lines.

4. The decision feedback equalizer according to claim 2, wherein the third amplifier and the fourth amplifier are respectively coupled to first differential output lines and second differential output lines at the second drain nodes of the second pair of transistors respectively thereof and are respectively configured for driving voltages of the first output differential signal and the second output differential signal to the same voltage level respectively on the first differential output lines and the second differential output lines.

5. The decision feedback equalizer according to claim 2, wherein the first pair of transistors of the first polarity type and the second pair of transistors of the second polarity type respectively are NMOS and PMOS sets of transistors.

6. The decision feedback equalizer according to claim 2, wherein the same voltage level is an analog supply voltage level.

7. A method for decision feedback equalization, comprising:
obtaining an input differential signal by a first integrating summer and a second integrating summer, the first integrating summer and the second integrating summer configured to alternatively receive a bias current from a bias current circuit using first and second current steering transistors,
wherein the first integrating summer receives the bias current using only the first current steering transistor of the first and second current steering transistors,
wherein the second integrating summer receives the bias current using only the second current steering transistor of the first and second current steering transistors;
first integrating with the first integrating summer during a first clock phase of a clock signal for transconductance of the input differential signal to a first output differential signal;
first resetting with the second integrating summer during the first clock phase of the clock signal for driving residual voltages of a second output differential signal to a same voltage level;
propagating, using a first pair of conductive lines coupled to the first integrating summer, the first integrating and the first resetting of the first output differential signal;
second integrating with the second integrating summer during a second clock phase of the clock signal for transconductance of the input differential signal to the second output differential signal; and
second resetting with the first integrating summer during the second clock phase of the clock signal for driving residual voltages of the first output differential signal to the same voltage level;
propagating, using a second pair of conductive lines coupled to the second integrating summer, the second integrating and the second resetting of the second output differential signal;
processing signals propagated by the propagating steps using a current steering current circuit,
wherein the current steering circuit is configured with a first amplifier and a second amplifier respectively coupled to the first pair of conductive lines and the second pair of conductive lines; and
wherein the current steering circuit includes an adjustable bias current source in common between the first amplifier and the second amplifier.

8. The method according to claim 7, wherein the first integrating comprises:
electrically coupling the bias current from the bias current circuit to an odd bias node of a third amplifier of the first integrating summer; and
electrically decoupling the same voltage level from a first pair of transistors of the third amplifier, the first pair of transistors configured for the transconductance of the input differential signal to the first output differential signal.

9. The method according to claim 8, wherein the first resetting comprises:
electrically decoupling the bias current from the bias current circuit from an even bias node of a fourth amplifier of the second integrating summer; and
electrically coupling the same voltage level to a second pair of transistors of the fourth amplifier.

10. The method according to claim 9, wherein the second integrating comprises:
electrically coupling the bias current from the bias current circuit to the even bias node of the fourth amplifier of the second integrating summer; and
electrically decoupling the same voltage level from the second pair of transistors of the fourth amplifier, the second pair of transistors configured for the transconductance of the input differential signal to the second output differential signal.

11. The method according to claim 10, wherein the second resetting comprises:
electrically decoupling the bias current from the bias current circuit from the odd bias node of the third amplifier of the first integrating summer; and
electrically coupling the same voltage level to the first pair of transistors of the third amplifier.

12. The method according to claim 11, wherein the same voltage level is an analog supply voltage level.

13. A decision feedback equalizer, comprising:
a single stage integrating summer having a first integrating summer and a second integrating summer, the first integrating summer and the second integrating summer configured to alternatively receive a bias current from a bias current circuit using first and second current steering transistors,
wherein the first integrating summer is configured to receive the bias current using only the first current steering transistor of the first and second current steering transistors, and
wherein the second integrating summer is configured to receive the bias current using only the second current steering transistor of the first and second current steering transistors;
each of the first integrating summer and the second integrating summer configured to receive a same input differential signal;
the first integrating summer configured for integrating during a first bit period for transconductance of the input differential signal to a first output differential signal and for resetting during a second bit period immediately following the first bit period for driving residual voltages of the first output differential signal to a same voltage level;
the second integrating summer configured for integrating during the second bit period for transconductance of the input differential signal to a second output differential signal and for resetting during a third bit period immediately following the second bit period for driving residual voltages of the second output differential signal to the same voltage level;

a first pair of conductive lines coupled to the first integrating summer for propagating the integrating and the resetting of the first output differential signal;

a second pair of conductive lines coupled to the second integrating summer for propagating the integrating and the resetting of the second output differential signal;

a current steering circuit configured with a first amplifier and a second amplifier respectively coupled to the first pair of conductive lines and the second pair of conductive lines; and the current steering circuit having an adjustable bias current source in common between the first amplifier and the second amplifier.

14. The decision feedback equalizer according to claim 13, wherein the first amplifier and the second amplifier each comprise:

a first pair of transistors of a first polarity type coupled to one another at source nodes thereof and having gates configured for receiving either an odd or an even portion of a differential feedback respectively associated with either the first output differential signal or the second output differential signal;

the first pair of transistors configured for the transconductance of the differential feedback to first drain nodes thereof respectively coupled to the first pair of conductive lines;

a third transistor of the first polarity type having a drain node coupled to the source nodes of the first pair of transistors and having a source node coupled to the adjustable bias current source, wherein the third transistor is one of the first and second current steering transistors; and a gate of the third transistor configured for receiving either a first clock signal or a second clock signal respectively for the first amplifier or the second amplifier, the first clock signal being out of phase with respect to the second clock signal for alternately steering the bias current from the adjustable bias current source to the first amplifier or the second amplifier.

15. The decision feedback equalizer according to claim 14, wherein:

the first integrating summer and the second integrating summer are respectively coupled to the first amplifier and the second amplifier via the first pair of conductive lines and the second pair of conductive lines, respectively;

the first integrating summer and the second integrating summer each comprise:

a second pair of transistors of a second polarity type having source nodes configured for receiving the same voltage level and having second drain nodes respectively coupled to the first drain nodes of the first pair of transistors; and the gate of the third transistor and gates of the second pair of transistors configured for receiving either the first clock signal or the second clock signal respectively for the first integrating summer or the second integrating summer.

16. The decision feedback equalizer according to claim 13, further comprising:

a first plurality of comparators coupled to the first pair of conductive lines;

a second plurality of comparators coupled to the second pair of conductive lines; and the first plurality of comparators and the second plurality of comparators configured for unrolling of a first decision feedback equalization correction tap.

17. The decision feedback equalizer according to claim 16, wherein the first integrating summer and the second integrating summer respectively comprise a third amplifier and a fourth amplifier;

wherein the third amplifier and the fourth amplifier each comprise:

a first pair of transistors of a first polarity type coupled to one another at source nodes thereof and having gates configured for respectively receiving a positive side and a negative side of the input differential signal;

the first pair of transistors configured for the transconductance of the input differential signal to first drain nodes thereof;

a third transistor of the first polarity type having a drain node coupled to the source nodes of the first pair of transistors and having a source node coupled to the bias current circuit, wherein the third transistor is one of the first and second current steering transistors;

a second pair of transistors of a second polarity type having source nodes configured for receiving the same voltage level and having second drain nodes respectively coupled to the first drain nodes of the first pair of transistors; and gates of the third transistor and the second pair of transistors configured for receiving either a first clock signal or a second clock signal respectively for the first integrating summer or the second integrating summer.

18. The decision feedback equalizer according to claim 17, wherein the third amplifier and the fourth amplifier are respectively coupled to the first pair of conductive lines and the second pair of conductive lines at the first drain nodes of the first pair of transistors respectively thereof for respectively providing the first output differential signal and the second output differential signal.

19. The decision feedback equalizer according to claim 17, wherein the third amplifier and the fourth amplifier are respectively coupled to the first pair of conductive lines and the second pair of conductive lines at the second drain nodes of the second pair of transistors respectively thereof for driving voltages of the first output differential signal and the second output differential signal to the same voltage level.

* * * * *